United States Patent
Miyamoto

(10) Patent No.: US 9,762,858 B2
(45) Date of Patent: Sep. 12, 2017

(54) COMMUNICATION APPARATUS, COMMUNICATION SYSTEM, METHOD FOR CONTROLLING COMMUNICATION APPARATUS, AND STORAGE MEDIUM

(71) Applicant: Atsushi Miyamoto, Kanagawa (JP)

(72) Inventor: Atsushi Miyamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/181,756

(22) Filed: Jun. 14, 2016

(65) Prior Publication Data
US 2016/0373692 A1    Dec. 22, 2016

(30) Foreign Application Priority Data

Jun. 19, 2015    (JP) ................................ 2015-124149

(51) Int. Cl.
| | |
|---|---|
| *H04N 7/15* | (2006.01) |
| *H04L 29/06* | (2006.01) |
| *G06F 3/0481* | (2013.01) |
| *G06F 1/32* | (2006.01) |
| *H04N 7/14* | (2006.01) |
| *H04N 21/41* | (2011.01) |

(52) U.S. Cl.
CPC ............. *H04N 7/15* (2013.01); *G06F 1/3218* (2013.01); *G06F 3/0481* (2013.01);
(Continued)

(58) Field of Classification Search
CPC H04N 7/14; H04N 7/147; H04N 7/15; H04N 7/152
(Continued)

(56) References Cited

U.S. PATENT DOCUMENTS

| | | | |
|---|---|---|---|
| 8,767,032 B2 | 7/2014 | Rodman | |
| 2006/0083194 A1* | 4/2006 | Dhrimaj | H04M 1/7253 370/328 |

(Continued)

FOREIGN PATENT DOCUMENTS

| | | |
|---|---|---|
| EP | 1 901 545 A1 | 3/2008 |
| EP | 2 398 237 A1 | 12/2011 |

(Continued)

OTHER PUBLICATIONS

Extended European Search Report issued Dec. 15, 2016 in Patent Application No. 16174590.6.

*Primary Examiner* — Melur Ramakrishnaiah
(74) *Attorney, Agent, or Firm* — Oblon, McClelland, Maier & Neustadt, L.L.P.

(57) ABSTRACT

A communication apparatus for causing a display device to display information about communication is disclosed, the display device being connected to the communication apparatus, the information about communication being received from a communication device. The communication apparatus includes an incoming call detection unit that detects an incoming call for starting the communication; an image output unit that outputs an image to the display device via a first communication path in order to cause the display device to display the information about communication; and a control unit that controls, via a second communication path in response to the detection of the incoming call, a display function of the display device, the second communication path being different from the first communication path. The control of the display function of the display device by the control unit enables the display device to display the information about communication.

11 Claims, 24 Drawing Sheets

(52) U.S. Cl.
CPC ........ *H04L 65/1069* (2013.01); *H04L 65/403* (2013.01); *H04N 7/142* (2013.01); *H04N 21/4122* (2013.01); *G09G 2370/16* (2013.01); *G09G 2370/22* (2013.01)

(58) Field of Classification Search
USPC .......................................... 348/14.01–14.16
See application file for complete search history.

(56) References Cited

U.S. PATENT DOCUMENTS

| | | | |
|---|---|---|---|
| 2007/0009113 A1 | 1/2007 | Kenoyer et al. | |
| 2007/0250567 A1* | 10/2007 | Graham | H04L 12/18 709/204 |
| 2009/0315973 A1* | 12/2009 | Izotov | H04L 65/403 348/14.07 |
| 2013/0227015 A1 | 8/2013 | Mihara et al. | |
| 2014/0320584 A1* | 10/2014 | Kumar | H04N 7/147 348/14.03 |
| 2014/0361954 A1 | 12/2014 | Epstein | |

FOREIGN PATENT DOCUMENTS

| | | |
|---|---|---|
| EP | 2 511 811 A2 | 10/2012 |
| JP | 2006-333481 | 12/2006 |
| JP | 2013-175059 | 9/2013 |
| JP | 2015-049735 | 3/2015 |

\* cited by examiner

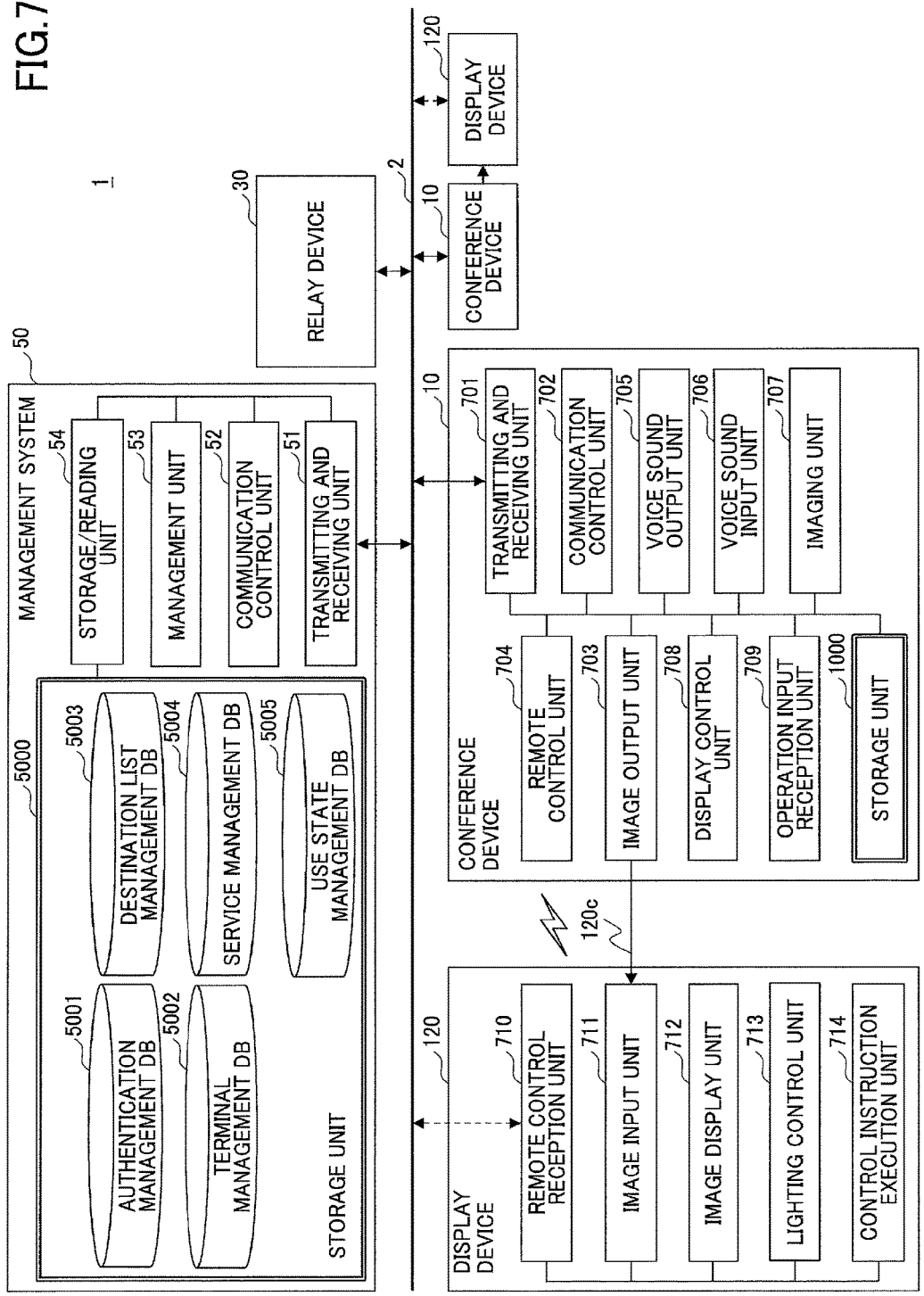

FIG.8A

| TERMINAL ID | PASSWORD |
|---|---|
| 01aa | aaaa |
| 01ab | abab |
| 01ba | baba |
| ... | ... |

FIG.8B

| TERMINAL ID | DESTINATION NAME | OPERATION STATE | RECEPTION DATE AND TIME | IP ADDRESS OF TERMINAL |
|---|---|---|---|---|
| 01aa | JAPAN, TOKYO OFFICE, TERMINAL AA | ON-LINE (COMMUNI-CATION IS POSSIBLE) | 2014.4.10.13:40 | 1.2.1.3 |
| 01ab | JAPAN, OSAKA OFFICE, TERMINAL AB | OFF-LINE | 2014.4.09.12:00 | 1.2.1.4 |
| ... | ... | ... | ... | ... |
| 01ba | CHINA, BEIJING OFFICE, TERMINAL BA | ON-LINE (COMMUNI-CATION IS POSSIBLE) | 2014.4.10.13:45 | 1.2.2.3 |
| 01bb | CHINA, SHANGHAI OFFICE, TERMINAL BB | ON-LINE (SUSPENDED) | 2014.4.10.13:50 | 1.2.2.4 |
| ... | ... | ... | ... | ... |
| 01ca | UNITED STATES, WASHINGTON D.C. OFFICE, TERMINAL CA | OFF-LINE | 2014.4.10.12:45 | 1.3.1.3 |
| 01cb | UNITED STATES, NEW YORK OFFICE, TERMINAL CB | ON-LINE (IN COMMUNICATION) | 2014.4.10.13:55 | 1.3.1.4 |
| ... | ... | ... | ... | ... |
| 01da | EUROPE, BERLIN OFFICE, TERMINAL DA | ON-LINE (IN COMMUNICATION) | 2014.4.08.12:45 | 1.3.2.3 |
| 01db | EUROPE, LONDON OFFICE, TERMINAL DB | ON-LINE (COMMUNI-CATION IS POSSIBLE) | 2014.4.10.12:45 | 1.3.2.4 |
| ... | ... | ... | ... | ... |

FIG.8C

| REQUESTOR TERMINAL ID | DESTINATION TERMINAL ID |
|---|---|
| 01aa | 01ab,···,01ba,01bb,···,01ca,01cb,01da,01db,··· |
| 01ab | 01aa,01ca,01cb |
| 01ba | 01aa,01ab,01ca,01cb,01da,01db |
| ··· | ··· |
| 01db | 01aa,01ab,01ba,···,01ca,01cb,···,01da |

FIG.9A

| SERVICE ID | QUALITY ID |
|---|---|
| sv901 | q01 |
| sv902 | q01 |
| sv903 | q01 |
| sv904 | q02 |
| sv905 | q02 |
| sv906 | q02 |
| sv907 | q02 |
| sv908 | q02 |
| ... | ... |

FIG.9B

| QUALITY ID | SESSION ID | USE STATE |
| --- | --- | --- |
| q01 | se11 | 1 |
| q01 | se12 | 0 |
| q02 | se21 | 1 |
| q02 | se22 | 0 |
| q02 | se23 | 0 |
| q03 | se31 | 0 |
| q03 | se32 | 1 |
| q03 | se33 | 0 |
| q03 | se34 | 0 |
| ... | ... | ... |

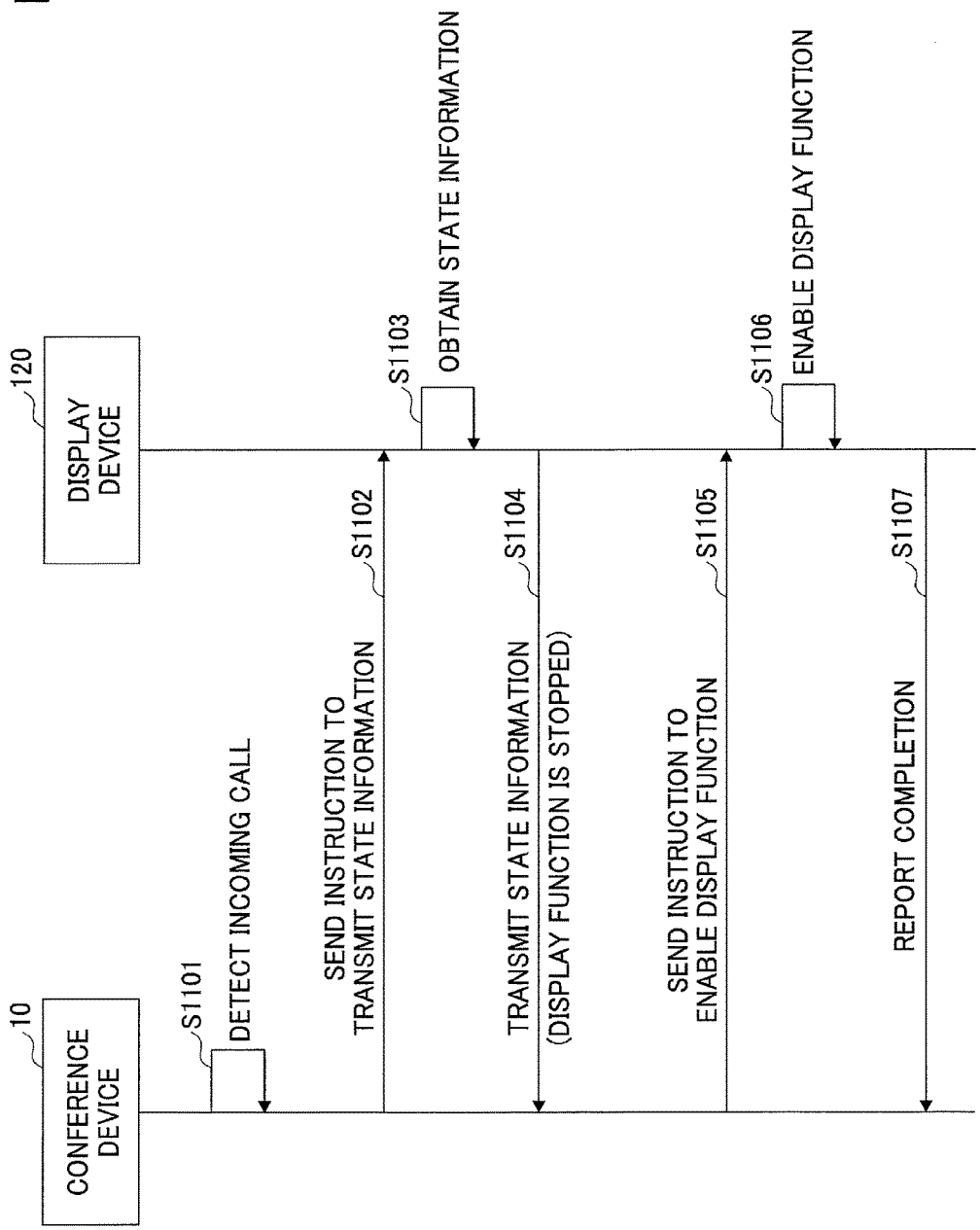

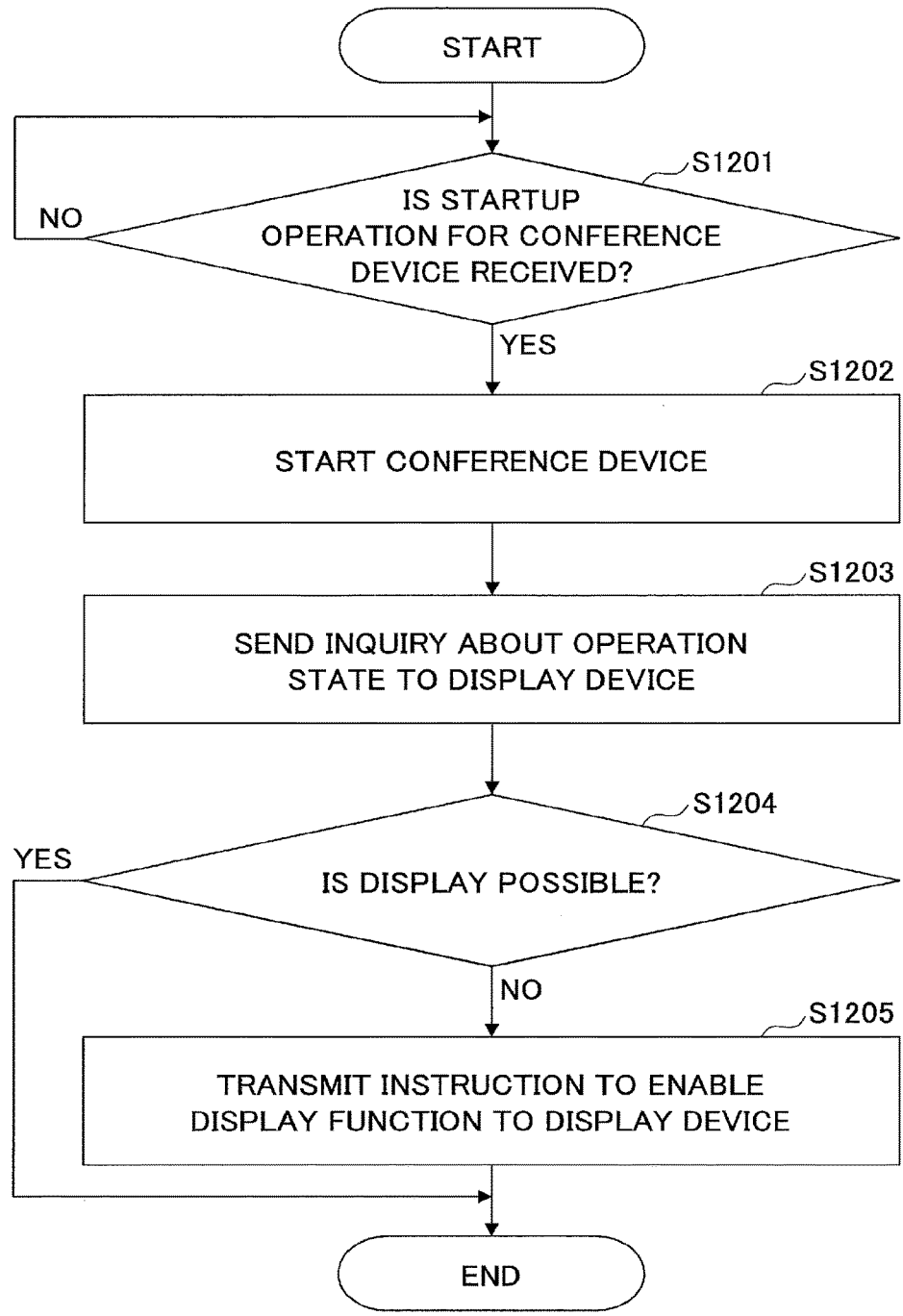

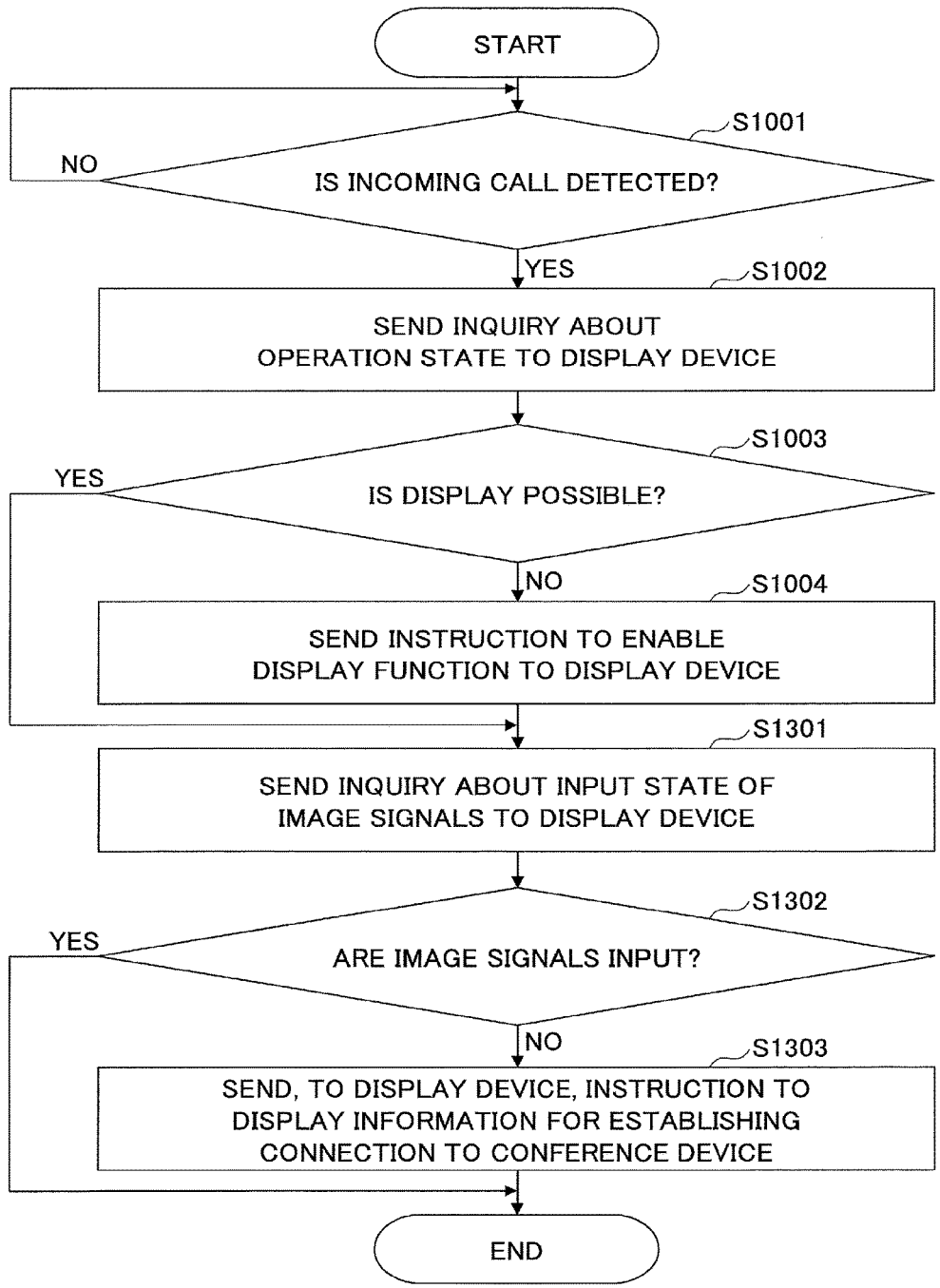

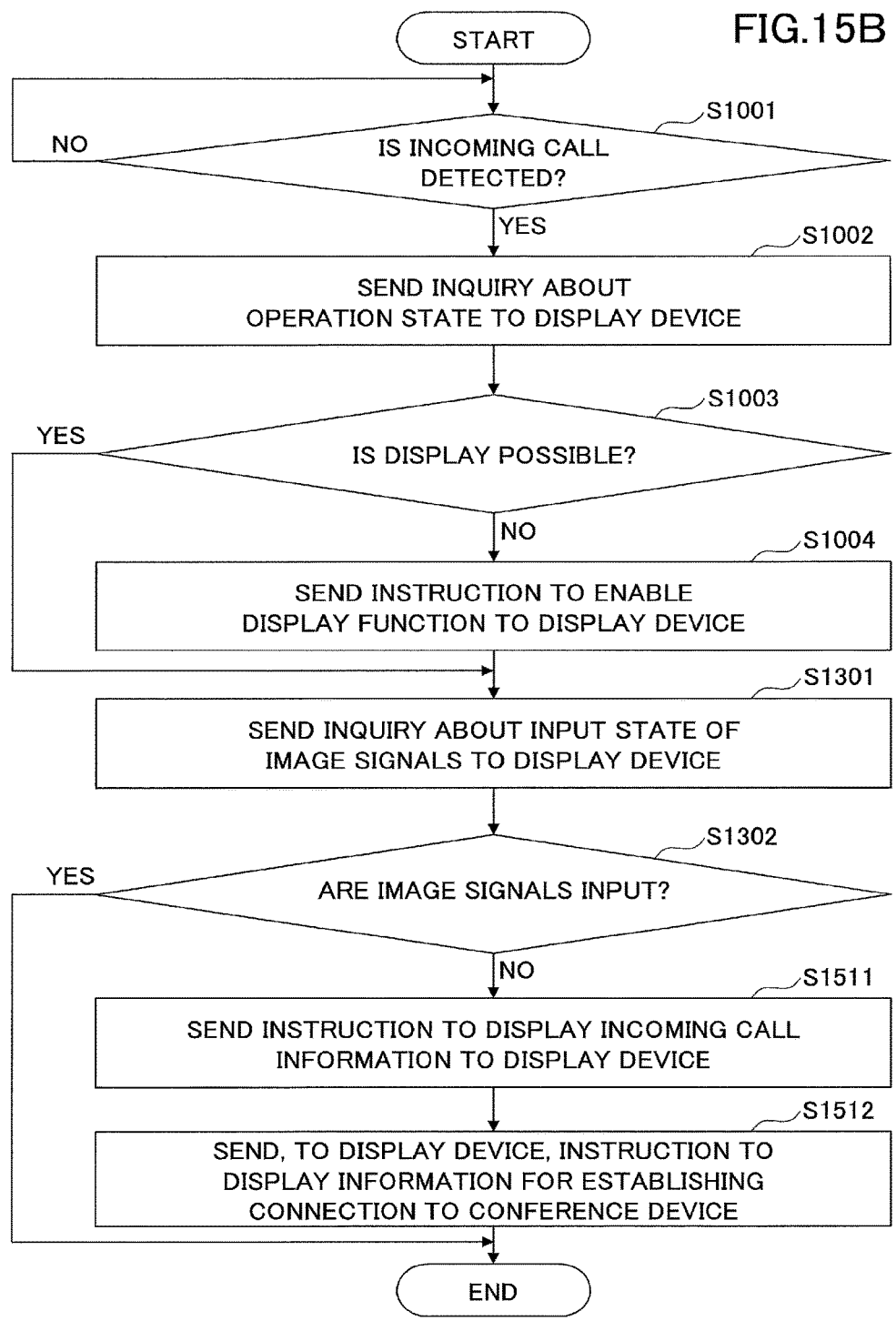

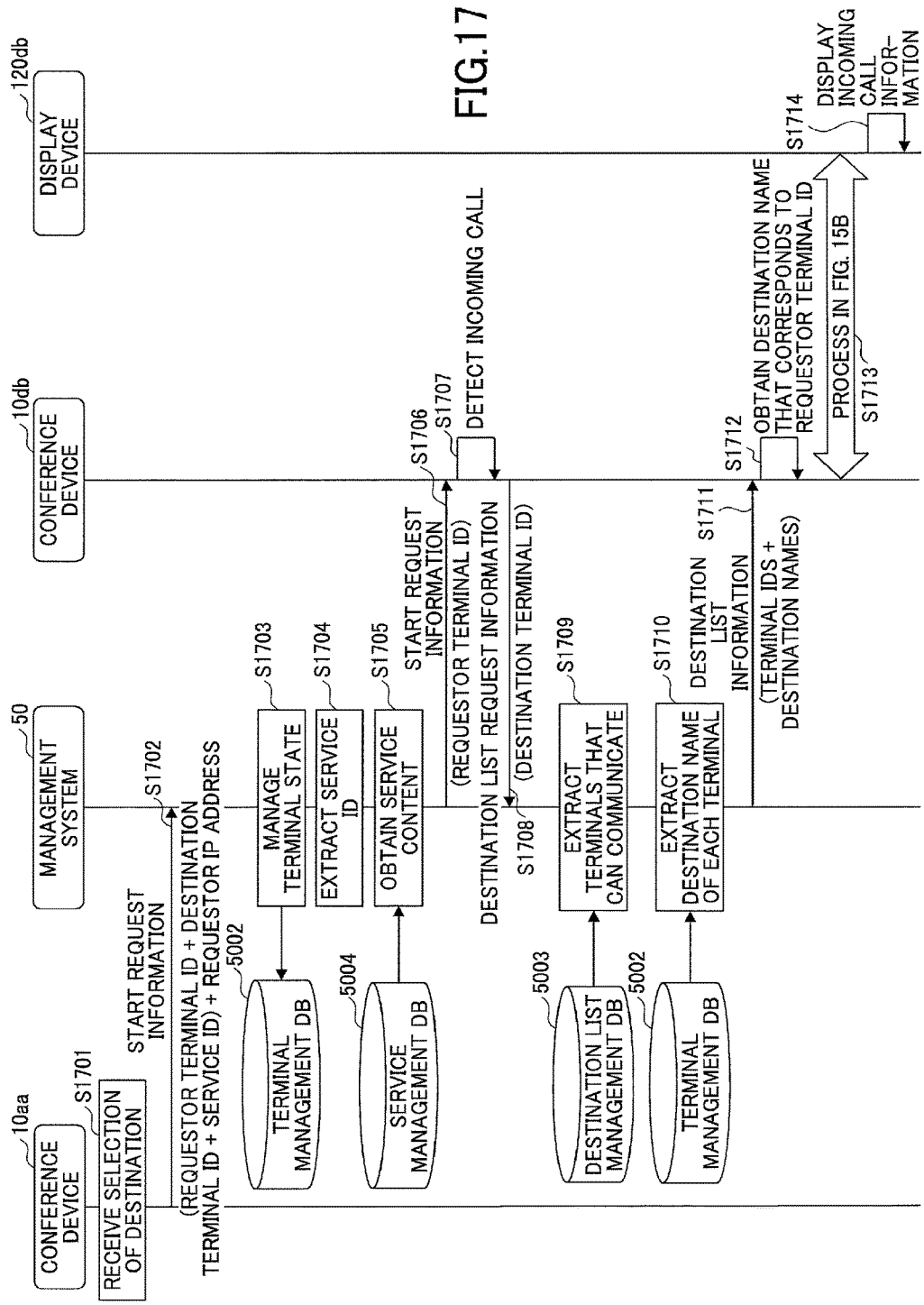

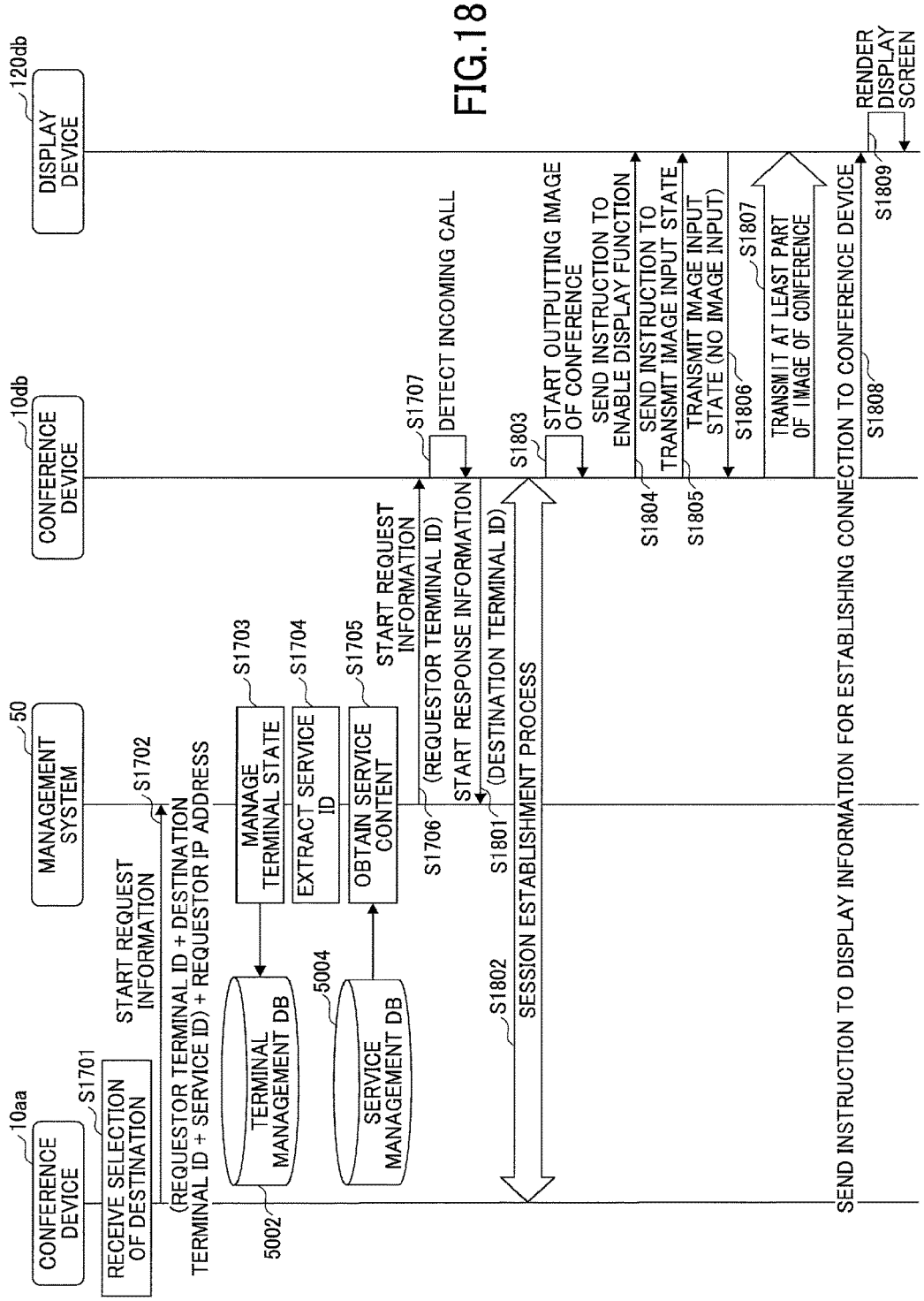

COMMUNICATION APPARATUS, COMMUNICATION SYSTEM, METHOD FOR CONTROLLING COMMUNICATION APPARATUS, AND STORAGE MEDIUM

BACKGROUND OF THE INVENTION

1. Field of the Invention

The present invention relates to a communication apparatus, a communication system, a method for controlling a communication apparatus, and a storage medium.

2. Description of the Related Art

There are conference devices that cause an externally connected display device to display an image of a conference (see Patent Document 1, for example).

Further, there are conference systems that use a control interface of a speaker phone or a remote controller thereof during a conference call to control a speaker phone, a video conference facility, a room control device, or another connected device (see Patent Document 2, for example).

According to the conference device disclosed in Patent Document 1, it is possible to display an image of a conference on an external display device such as a projector, a display screen, or the like depending on a scale of the conference.

However, when such an external display device receives an incoming call, a display function may not work, for example. The display function may not be enabled until a user's operation is performed. Accordingly, when the conference device receives the incoming call, the user is required to perform a troublesome operation such as power-on in order to cause the display device to display information about a caller.

Further, the technique disclosed in Cited Document 2 makes it easy for the user to control various devices related to a video conference rather than addressing the above issue.

In this manner, according to techniques in related art, it is not easy to cause the external display device to display information about a communication partner (such as information about a caller) without causing trouble for the user if an operation by the user is necessary to enable the display function in such a case where the conference device that causes the externally connected display device to display an image related to a conference during the conference has stopped the display function of the external display device when an incoming call is received. Such an issue is common in communication devices not only for conferences but also for communication among users via a network.

RELATED ART DOCUMENTS

[Patent Document 1] Japanese Laid-Open Patent Application No. 2013-175059
[Patent Document 2] Japanese Laid-Open Patent Application No. 2006-333481

SUMMARY OF THE INVENTION

It is an object of at least one embodiment of the present invention to provide a communication apparatus that causes an externally connected display device to display information about communication received from another communication device, by which even if a display function of the display device is disabled when an incoming call is received, information about communication (information about a caller, for example) is easily displayed on the display device.

According to an embodiment of the present invention, there is provided a communication apparatus for causing a display device to display information about communication, the display device being connected to the communication apparatus, the information about communication being received from a communication device. The communication apparatus includes an incoming call detection unit that detects an incoming call for starting the communication; an image output unit that outputs an image to the display device via a first communication path in order to cause the display device to display the information about communication; and a control unit that controls, via a second communication path in response to the detection of the incoming call, a display function of the display device, the second communication path being different from the first communication path. The control of the display function of the display device by the control unit enables the display device to display the information about communication.

BRIEF DESCRIPTION OF THE DRAWINGS

Other objects and further features of embodiments will become apparent from the following detailed description when read in conjunction with the accompanying drawings, in which:

FIG. 7 is a diagram depicting a functional configuration of a transmission system according to embodiments;

FIG. 8A depicts an authentication management table managed by a management system according to embodiments;

FIG. 8B depicts a terminal management table managed by a management system according to embodiments;

FIG. 8C depicts a destination list management table managed by a management system according to embodiments;

FIG. 9A depicts a service management table managed by a management system according to embodiments;

FIG. 9B depicts a use state management table managed by a management system according to embodiments;

FIG. 11 is a sequence diagram depicting a process between a conference device and a display device according to the first embodiment;

FIG. 12A is a flowchart depicting an application example of a process performed by a conference device according to the first embodiment;

FIG. 13 is a flowchart depicting a process performed by a conference device according to a second embodiment;

FIG. 15B is a flowchart depicting a process performed by a conference device according to the third embodiment;

FIG. 17 is a sequence diagram depicting a process to obtain caller information in a transmission system according to the third embodiment;

FIG. 18 is a sequence diagram depicting an incoming call process according to a fourth embodiment.

DESCRIPTION OF THE PREFERRED EMBODIMENTS

In the following, embodiments of the present invention will be described in detail.

In the following, embodiments of the present invention will be described with reference to the accompanied drawings.

<System Configuration>

Figure 1:
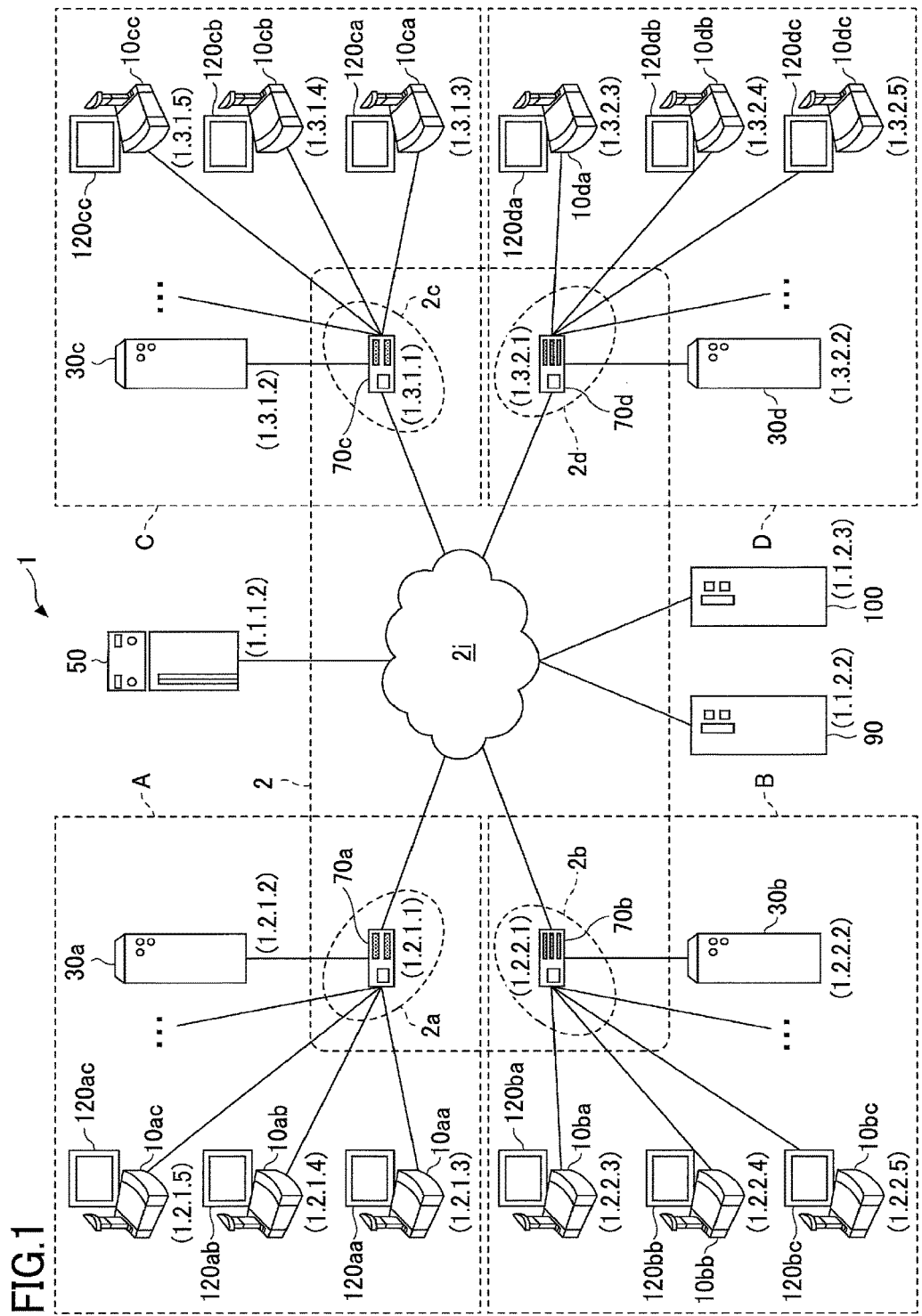
FIG. 1 is a schematic diagram of a transmission system according to embodiments.

FIG. 1 is a schematic diagram of a transmission system according to embodiments. In addition, the transmission system is an example of a conference system.

Transmission systems include a data providing system where content data is transmitted in a unidirectional manner from one transmission terminal to another transmission terminal via a transmission management system, and a communication system where information and feelings are interactively transmitted among a plurality of transmission terminals via a transmission management system. This communication system may be a system for interactively transmitting information and feelings among a plurality of communication terminals (corresponding to "transmission terminals") via a communication management system (corresponding to a "transmission management system"). Examples of the communication system include a video conference system and a video phone system.

In the embodiments, it is assumed that the video conference system is an example of the communication system, a video conference management system is an example of the communication management system, and a video conference device is an example of the communication terminal. Further, the transmission system, the transmission management system, and the conference device are described. In other words, the conference device and the transmission management system of the present invention may be applied not only to the video conference system but also to the communication system or to the transmission system.

First, a transmission system 1 depicted in FIG. 1 includes a plurality of conference devices (10aa, 10ab, ... ), display devices (120aa, 120ab, ... ) for corresponding conference devices (10aa, 10ab, ... ), a plurality of relay devices (30a, 30b, 30c, 30d), a transmission management system 50, a program providing system 90, a maintenance system 100, and the like. Further, the conference devices (10aa, 10ab, ... ) perform transmission by transmitting and receiving image data and sound data as an example of content data.

In the following description, the "transmission management system" may also be simply described as a "management system" and a given conference device among the conference devices (10aa, 10ab, ... ) may also be described as a "conference device 10." Further, a given display device among the display devices (120aa, 120ab, ... ) may also be described as a "display device 120," a given relay device among the relay devices (30a, 30b, 30c, 30d) may also be described as a "relay device 30." Further, a conference device that sends a request for starting a video conference as a requestor may also be described as a "requestor terminal" and a conference device to which the request is sent as a destination (relay destination) may also be described as a "destination terminal."

The relay device 30 as depicted in FIG. 1 relays content data among a plurality of conference devices 10. The management system 50 manages log-in authentication from the conference device 10, a call status of the conference device 10, a destination list, a communication status of the relay device 30, and the like in an integrated manner. In addition, an image of image data may be a movie or a still image or may be both the movie and the still image.

A plurality of routers (70a, 70b, 70c, 70d, 70ab, 70cd) select an optimum route for image data and sound data. In the following, a given router among the routers (70a, 70b, 70c, 70d, 70ab, 70cd) is described as a "router 70."

The program providing system 90 includes a Hard Disk (HD) 204 described below in which a conference device program for implementing various functions for the conference device 10 (or causing the conference device 10 to function as various units) is stored. The program providing system 90 can transmit the conference device program to the conference device 10.

Further, in a (Hard Disk) HD 204 of the program providing system 90, a relay device program for implementing various functions for the relay device 30 (or causing the relay device 30 to function as various units) is also stored. The program providing system 90 can transmit the relay device program to the relay device 30. Further, in the HD 204 of the program providing system 90, a transmission management program for implementing various functions for the management system 50 (or causing the management system 50 to function as various units) is also stored. The program providing system 90 can transmit the transmission management program to the management system 50.

The maintenance system 100 includes a computer for supporting, managing, or maintaining at least one of the conference device 10, the relay device 30, the management system 50, and the program providing system 90. For example, it is assumed that the maintenance system 100 is located within the country and the conference device 10, the relay device 30, the management system 50, or the program providing system 90 is located outside the country. In this case, the maintenance system 100 remotely performs maintenance such as support, management, or the like on at least one of the conference device 10, the relay device 30, the management system 50, and the program providing system 90 via a communication network 2. Further, the maintenance system 100 performs maintenance such as management of a model number, a serial number, a customer's address, maintenance and inspection, or failure history on the conference device 10, the relay device 30, the management system 50, the program providing system 90 or the like without the communication network 2.

The conference devices (10aa, 10ab, ... ), the relay device 30a, and the router 70a are communicatively connected via a LAN 2a. The conference devices (10ba, 10bb, 10bc, ... ), the relay device 30b, and the router 70b are communicatively connected via a LAN 2b. The LAN 2a and the LAN 2b are communicatively connected and the LAN 2a and the LAN 2b are constructed within predetermined regions A and B. For example, the region A is Japan and the LAN 2a is constructed within an office in Tokyo and the region B is China and the LAN 2b is constructed within an office in China.

Conference devices (10ca, 10cb, . . . ), the relay device 30c, and the router 70c are communicatively connected via a LAN 2c. Conference devices (10da, 10db, 10dc, . . . ), the relay device 30d, and the router 70d are communicatively connected via a LAN 2d. The LAN 2c and the LAN 2d are communicatively connected and the LAN 2c and the LAN 2d are constructed within predetermined regions C and D. For example, the region C is the United States of America and the LAN 2c is constructed within an office in the United States and the region D is Europe and the LAN 2d is constructed within an office in Europe. The routers (70a, 70b, 70c, 70d) are communicatively connected via the Internet 2i.

Further, the management system 50 and the program providing system 90 are communicatively connected to the conference device 10 and the relay device 30 via the Internet 2i. The management system 50 and the program providing system 90 may be disposed in the region A, the region B, the region C, the region D, or another region.

In the embodiments, the LAN 2a, the LAN 2b, the LAN 2c, the LAN 2d, and the Internet 2i are included in the communication network 2. The communication network 2 may have a part where wireless communication such as Wireless Fidelity (WiFi) (registered trademark) or Bluetooth (registered trademark) is performed in addition to wired communication.

In FIG. 1, a set of four numbers shown beneath each conference device 10, each relay device 30, the management system 50, each router 70, and the program providing system 90 indicates an IP address in general IPv4 in a simplified manner. For example, the IP address of the conference device 10aa is "1.2.1.3." While IPv6 may be used instead of IPv4, IPv4 is used in order to simplify descriptions.

Each conference device 10 may be used not only for a call between offices or a call between different rooms in the same office but also for a call in the same room or a call between an outdoor place and an indoor place or between outdoor places. If the conference device 10 is used outdoors, public wireless communication such as a mobile phone communication network or a public wireless LAN is used.

Figure 2:
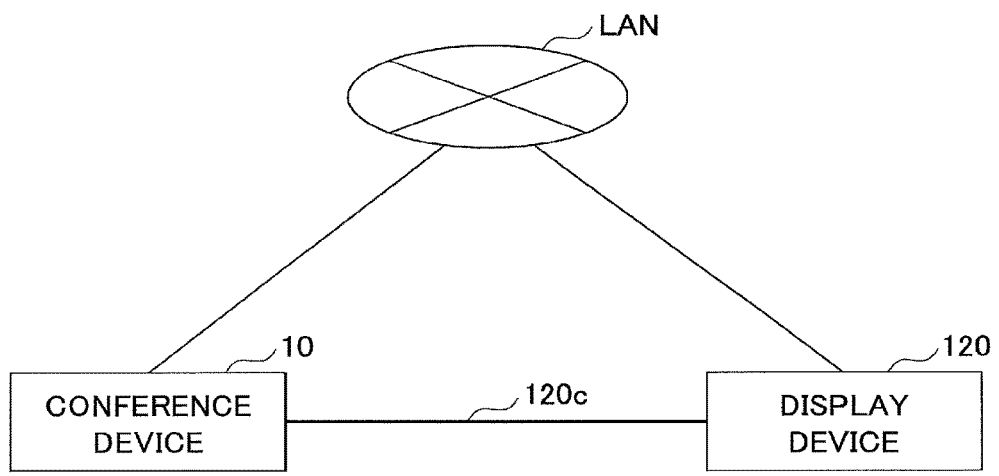
FIG. 2 is a diagram depicting connection of a conference device according to embodiments.

FIG. 2 is a diagram depicting connection of the conference device 10 according to embodiments.

The conference device 10 according to the embodiments is assumed to cause the externally connected display device 120 to display an image of a conference. In FIG. 2, the conference device 10 is connected to the display device 120 via an image transmission cable 120c.

Further, the conference device 10 and the display device 120 can transmit or receive data mutually via a communication unit other than the image transmission cable 120c. In FIG. 2, the conference device 10 and the display device 120 are connected to a LAN via a wired/wireless LAN interface, for example. This LAN is assumed to be a closed area network configured using Multi Protocol Label Switching (MPLS) or a network connected to the same router 70.

The display device 120 can display an IP address of its own device on a display screen in response to a predetermined operation, for example. A user of the conference device 10 is capable of transmitting or receiving data between the conference device 10 and the display device 120 when the user inputs the displayed IP address into the conference device 10, for example.

The configuration depicted in FIG. 2 is an example and a communication method between the conference device 10 and the display device 120 may be another communication method using wireless communication such as Bluetooth (registered trademark) or Wi-Fi Direct (registered trademark). Alternatively, the communication method between the conference device 10 and the display device 120 may be another communication method using wired communication such as a wired LAN cable or a Universal Serial Bus (USB) cable.

According to the above configuration, the conference device 10 and the display device 120 can communicate with each other even if the image transmission cable 120c is not connected.

<Hardware Configuration>

In the following, a hardware configuration of the embodiments is described.

(Appearance of Conference Device)

Figure 3:
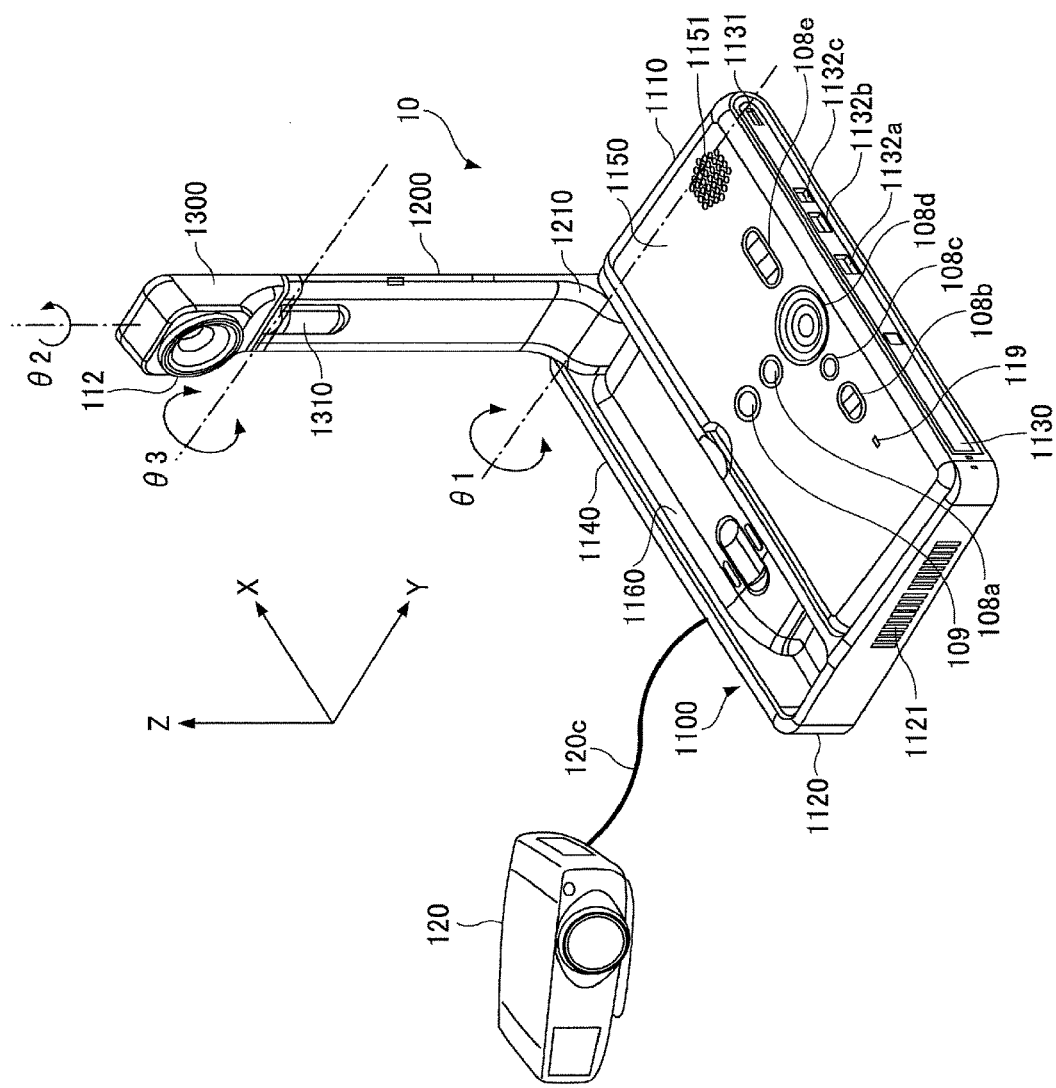
FIG. 3 is an external view of a conference device according to embodiments.

FIG. 3 is an external view of the conference device 10 according to embodiments. As depicted in FIG. 3, the conference device 10 includes a case 1100, an arm 1200, and a camera housing 1300. The case 1100 has a front wall surface 1110 where an air intake surface formed with a plurality of air intake holes is located. The case 1100 also has a rear wall surface 1120 where an air outlet surface 1121 formed with a plurality of air outlet holes is located. In accordance with these surfaces, by driving a cooling fan built in the case 1100, it is possible to take in external air in front of the conference device 10 via the air intake surface located on the front wall surface 1110 of the case 1100 and discharge the air backward from the conference device 10 via the air outlet surface 1121. The case 1100 has a right wall surface 1130 where a sound collection hole 1131 is formed and a built-in microphone 114 to be described later is capable of collecting voice sound, other sound, and noise.

An operation panel 1150 is formed on a right wall surface part of a top surface of the case 1100. On the operation panel 1150, a plurality of operation buttons (108a-108e), a power supply switch 109, and an alarm lamp to be described later are located. Further, on the operation panel 1150, a sound output surface 1151 formed with a plurality of sound output holes for issuing output sound from a built-in loudspeaker 115 to be described later is located.

On a left wall surface part of the top surface of the case 1100, a housing section 1160 for housing the arm 1200 and the camera housing 1300 is formed as a concave portion. On the right wall surface 1130 of the case 1100, a plurality of connection ports (1132a-1132c) for electrically connecting a cable to an external device connection I/F 118 to be described later are formed. On a left wall surface 1140 of the case 1100, a connection port for electrically connecting the image transmission cable 120c to a display screen I/F 117 is formed.

In the following, any one of the operation buttons (108a-108e) is described as an "operation button 108" and any one of the connection ports (1132a-1132c) is described as a "connection port 1132."

The arm 1200 is installed on the case 1100 via a torque hinge 1210. The arm 1200 is configured rotatably in upper and lower directions within a range of 135 degrees as a tilt angle θ1 relative to the case 1100. FIG. 3 shows a case where the tilt angle θ1 is 90 degrees. The camera housing 1300 has a built-in camera 112 to be described later and can take pictures of a user, a document, a room, and the like. On the camera housing 1300, a torque hinge 1310 is formed. The camera housing 1300 is installed on the arm 1200 via the torque hinge 1310. The camera housing 1300 is configured rotatably in right and left directions within a range of ±180 degrees as a pan angle θ2 and in upper and lower directions within a range of ±45 degrees as a tilt angle θ3 relative to the arm 1200 based on a state depicted in FIG. 3 as zero degrees.

The external view of FIG. 3 is only an example and an appearance is not limited to this. The conference device 10 may be a personal computer (PC), a smartphone, a tablet terminal or the like that is generally used. The camera and the microphone may not be of a built-in type but may be externally attached.

In FIG. 3, a projector is shown as an example of the display device 120. Because the transmission management system 50 has the same appearance as a general-purpose server computer, a description of its appearance is omitted.

(Hardware Configuration of Conference Device)

Figure 4:
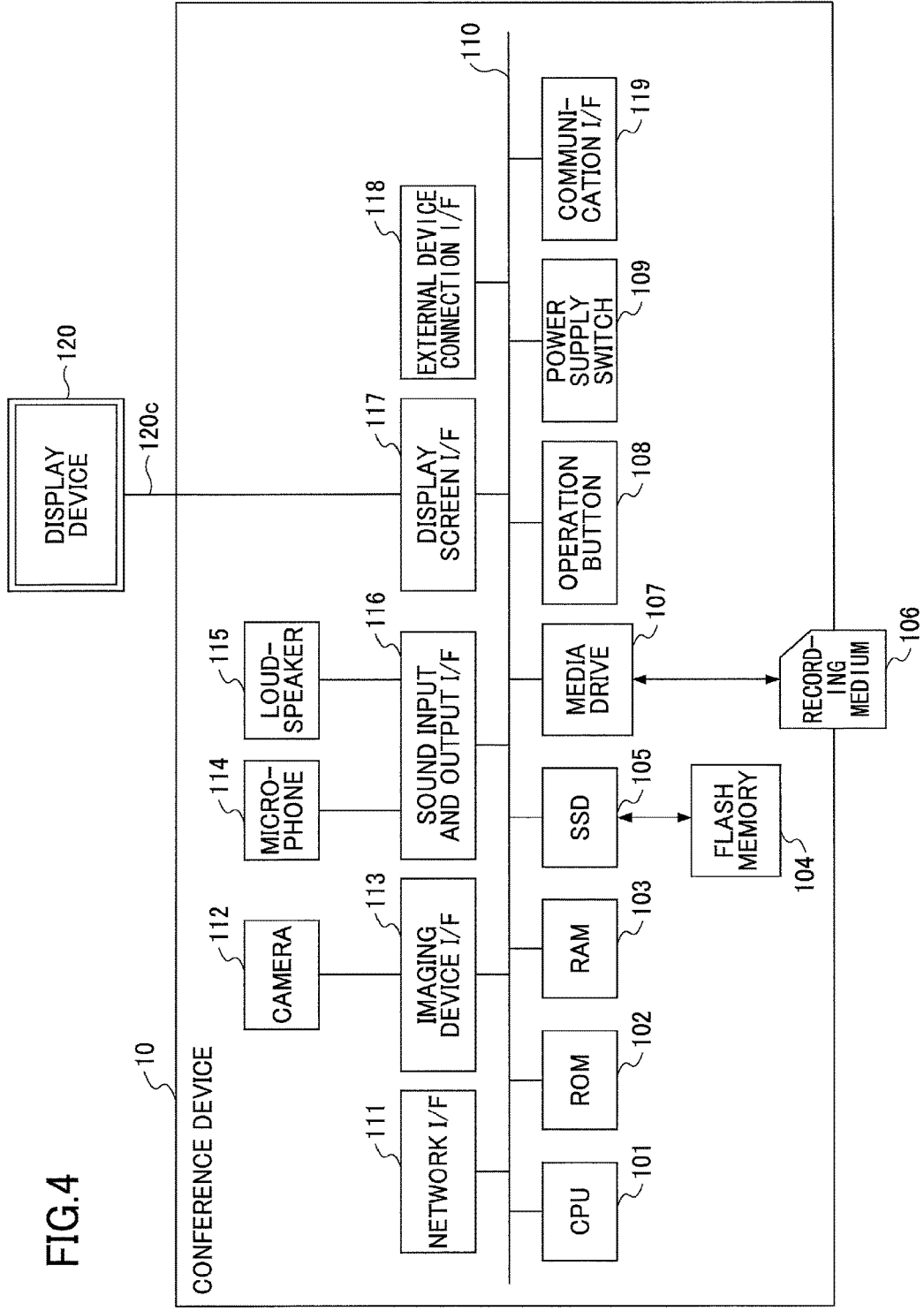
FIG. 4 is a diagram depicting a hardware configuration of a conference device according to embodiments.

FIG. 4 is a diagram depicting a hardware configuration of the conference device 10 according to embodiments. The conference device 10 has a hardware configuration of a typical computer. For example, the conference device 10 includes a Central Processing Unit (CPU) 101, a Read Only Memory (ROM) 102, a Random Access Memory (RAM) 103, a flash memory 104, and a Solid State Drive (SSD) 105. The conference device 10 further includes a media drive 107, the operation button 108, the power supply switch 109, a network interface (I/F) 111, the camera 112, an imaging device I/F 113, the microphone 114, the loudspeaker 115, and a sound input and output I/F 116. Further, the conference device 10 includes the display screen I/F 117, the external device connection I/F 118, a communication I/F 119, a bus 110, and the like.

The CPU 101 includes an arithmetic unit that implements functions of the conference device 10 by reading a program or data from the ROM 102, the flash memory 104, or the like and executing a process. The ROM 102 includes a non-volatile memory in which a program such as an Initial Program Loader (IPL) or the like used to start the CPU 101 is stored in advance. The RAM 103 includes a volatile memory used as a work area of the CPU 101.

The flash memory 104 includes a storage device that stores an Operating System (OS), an application program, and various types of data. The SSD 105 controls reading or writing of various types of data into the flash memory 104 in accordance with control of the CPU 101. The media drive 107 controls reading or writing (storage) of data into a recording medium 106 such as a memory card.

The operation button 108 includes an input device that receives an input operation of the user of the conference device 10. The power supply switch 109 includes a switch for switching ON/OFF a power supply for the conference device 10. The network I/F 111 includes a communication interface for transmitting data using the communication network 2.

The camera 112 includes an imaging device to take pictures of an object in accordance with control of the CPU 101. The imaging device I/F 113 controls the imaging by the camera 112 and converts imaging data into predetermined image data. The microphone 114 converts collected voice sound into electric signals. The loudspeaker 115 converts voice sound signals into voice sound and outputs the converted voice sound. The sound input and output I/F 116 controls input and output of voice sound using the microphone 114 and the loudspeaker 115.

The display screen I/F 117 transmits image data to the external display device 120 in accordance with control of the CPU 101. The external device connection I/F 118 is an interface for connecting to various types of external devices. The communication I/F 119 is a communication interface different from the network I/F 111. The communication I/F 119 may be used for short range wireless communication such as Bluetooth, wireless LAN communication such as Wi-Fi Direct, or a wireless Personal Area Network (PAN). The bus 110 is connected to each of the above elements and transfers an address signal, a data signal, and various types of control signals.

The display device 120 includes a display unit made of liquid crystal or organic electroluminescence (EL) material for displaying images of a subject, icons for operation, or the like. The display device 120 is connected to the display screen I/F 117 via the image transmission cable 120c. The image transmission cable 120c may be a cable for analogue RGB (VGA) signals or a cable for component video signals. Further, the image transmission cable 120c may be a cable for High-Definition Multimedia Interface (HDMI) (registered trademark) signals or a cable for Digital Video Interactive (DVI) signals.

The camera 112 includes a lens and a solid-state image sensing device for converting light into an electric charge to digitalize the images (video) of the subject. Examples of the solid-state image sensing device include a Complementary Metal Oxide Semiconductor (CMOS) device and a Charge Coupled Device (CCD).

An external device such as an external camera, an external microphone, or an external loudspeaker may be connected to the external device connection I/F 118 via a USB cable, for example. If the external camera is connected, the external camera is driven preferentially over the built-in camera 112 in accordance with control of the CPU 101. In the same manner, if the external microphone or the external loudspeaker is connected, the external microphone or the external loudspeaker is driven preferentially over the built-in microphone 114 or the built-in loudspeaker 115 in accordance with control of the CPU 101.

In addition, the recording medium 106 may be a storage medium including various types of memory cards and a Subscriber Identity Module (SIM) card. The recording medium 106 can be attached to or removed from the conference device 10.

The program above for the conference device 10 may be recorded and distributed in a computer-readable recording medium such as the recording medium 106 with a file of an installable format or an executable format. Further, the program for the conference device 10 may be stored in the flash memory 104, for example, or may be stored in the ROM 102 in advance.

(Hardware Configuration of Display Device)

In the following, a hardware configuration of a projector 500 as an example of the display device 120 is described.

Figure 5:
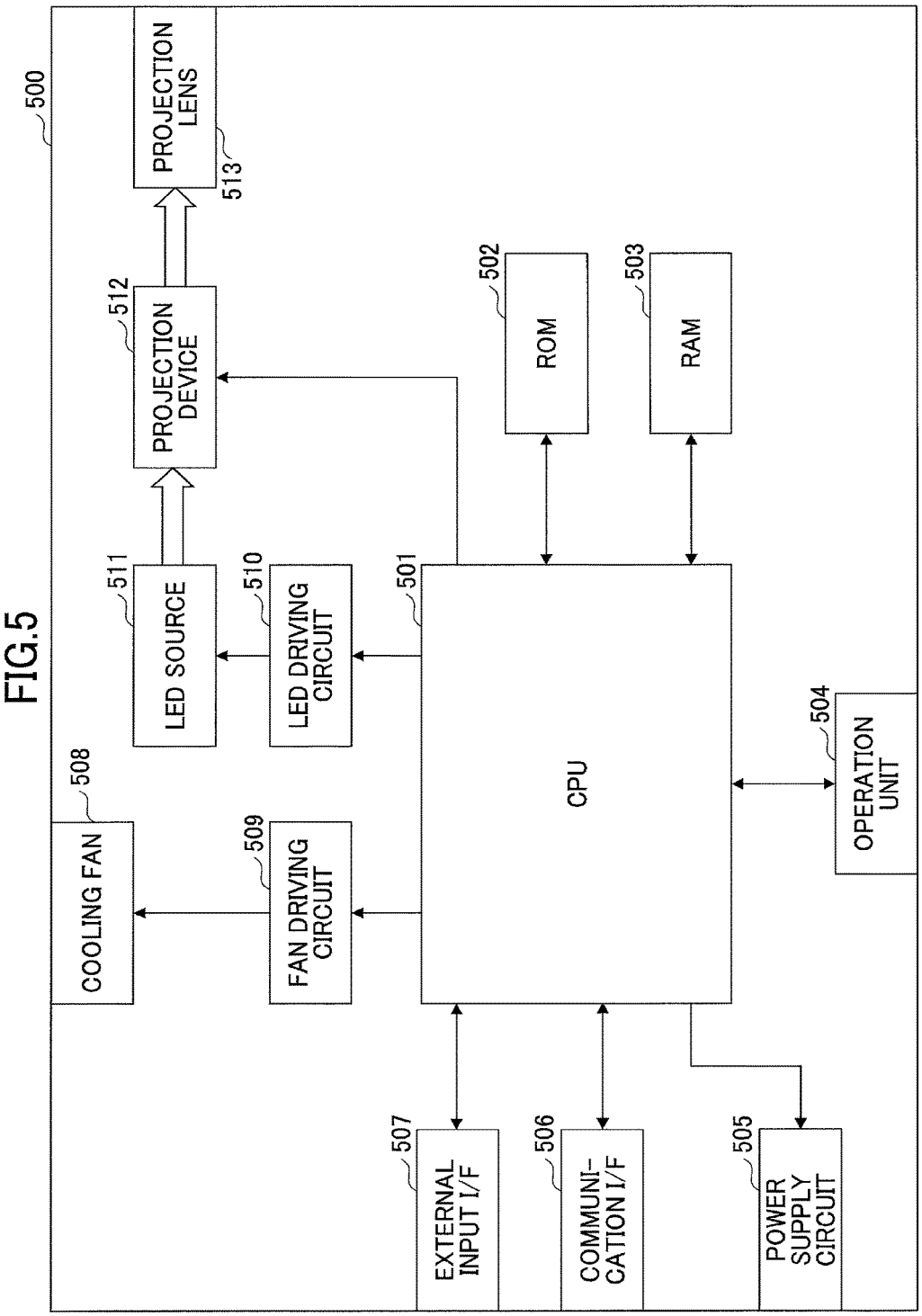
FIG. 5 is a diagram depicting a hardware configuration of a projector according to embodiments.

FIG. 5 is a diagram depicting a hardware configuration of the projector 500 according to embodiments.

As depicted in FIG. 5, the projector 500 includes a CPU 501, a ROM 502, a RAM 503, an operation unit 504, a power supply circuit 505, a communication I/F 506, an external input I/F 507, a cooling fan 508, a fan driving circuit 509, a Light Emitting Diode (LED) driving circuit 510, an LED source 511, a projection device 512, a projection lens 513, and the like.

The CPU 501 includes an arithmetic unit that implements functions of the projector 500 by executing a program stored in the ROM 502. The ROM 502 includes a non-volatile memory in which the program for the projector 500 or the like is stored. The ROM 502 may be a flash ROM, for example. The RAM 503 includes a volatile memory used as a work area of the CPU 501. The operation unit 504 includes an input device that receives an input operation of the user.

The power supply circuit 505 includes a power supply device that supplies electric power to each unit of the projector 500. The power supply circuit 505 of the projector 500 according to the embodiments supplies electric power to the CPU 501 and to the communication I/F 506 even if the projector 500 is powered off.

The communication I/F 506 is an interface for communicating with the conference device 10. Examples of the communication I/F 506 include a network interface for a wireless/wired LAN and a wireless/wired communication interface capable of communicating with the communication I/F 119 of the conference device 10.

The communication I/F 506 receives electric power from the power supply circuit 505 even if the projector 500 is powered off, so that the communication I/F 506 can transmit or receive a control instruction or the like to or from the conference device 10. Further the communication I/F 506 reports, to the CPU 501, the control instruction or the like received from the conference device 10.

The external input I/F 507 is an interface for connecting the projector 500 to the conference device 10 via the image transmission cable 120c. The projector 500 can project, on a projection plane, an image, video, or the like input via the external input I/F 507.

The cooling fan 508 cools an inner side of the projector 500 by rotating to discharge air of the inner side of the projector 500. The fan driving circuit 509 is connected to the CPU 501 and the cooling fan 508. The fan driving circuit 509 drives or stops the cooling fan 508 based on a control signal from the CPU 501.

The LED driving circuit 510 controls turning on/off the LED source 511 in accordance with control of the CPU 501. The LED source 511 projects light onto the projection device 512 in accordance with control from the LED driving circuit 510.

The projection device 512 modulates the light projected by the LED source 511 in a spatial light modulation method based on image data provided from the CPU 501 and projects the modulated light on a projection plane of a screen via the projection lens 513. A liquid crystal panel, a Digital Micromirror Device (MDM), or the like may be used as the projection device 512. The LED driving circuit 510, the LED source 511, the projection device 512, and the projection lens 513 collectively function as a projection unit that projects an image on the projection plane based on image data.

In addition, the projector 500 depicted in FIG. 5 is an example of the display device 120. Other than the projector 500, the display device 120 may be a display device such as a display screen, an electronic whiteboard, or digital signage.

(Hardware Configuration of Management System)

Figure 6:
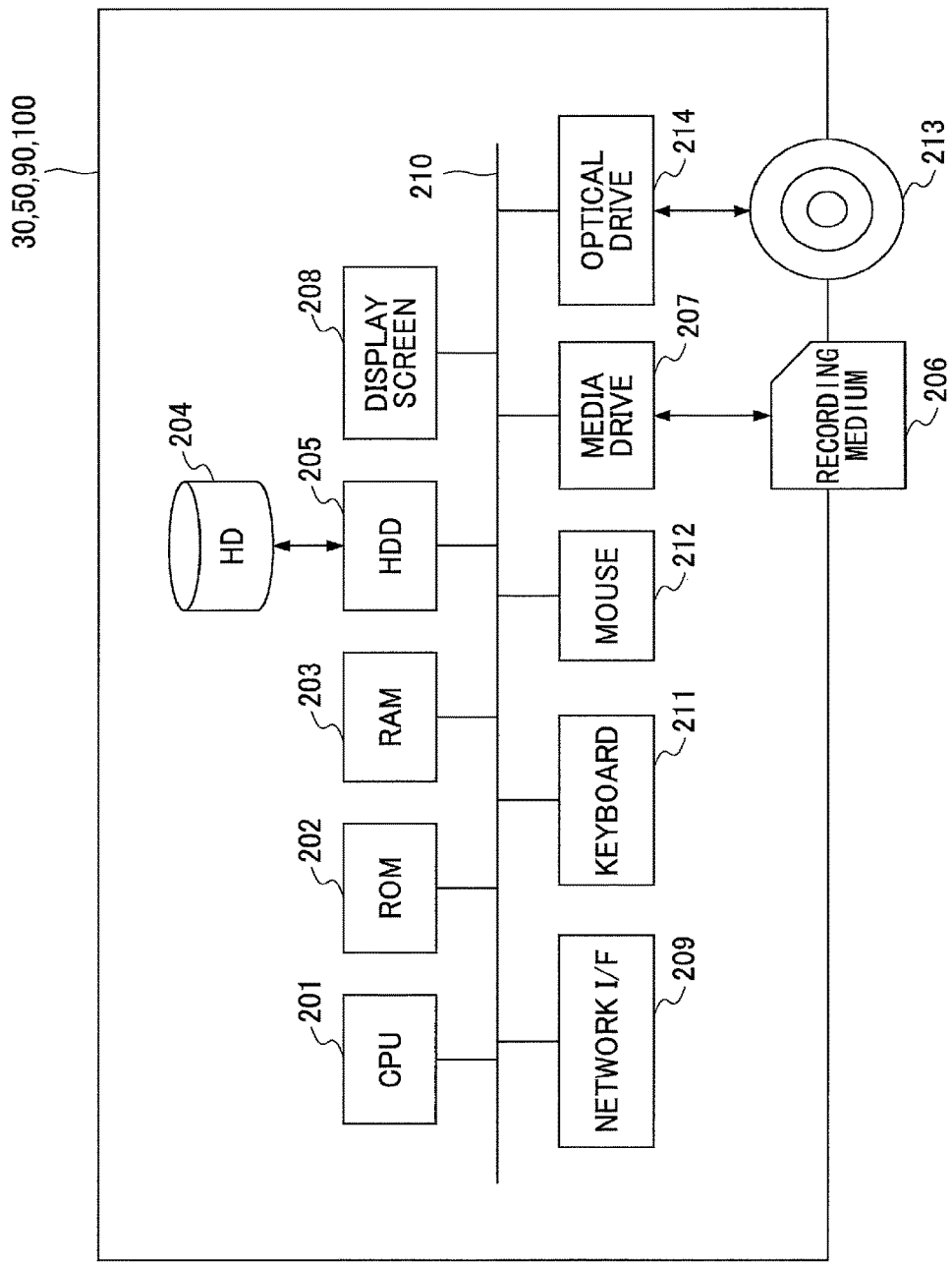
FIG. 6 is a diagram depicting a hardware configuration of a management system according to embodiments.

FIG. 6 is a diagram depicting a hardware configuration of the management system 50 according to embodiments. For example, the management system 50 has a hardware configuration of a typical computer. For example, the management system 50 includes a CPU 201, a ROM 202, a RAM 203, a HD 204, a (Hard Disk Drive) HDD 205, a media drive 207, and a display screen 208. Further, the management system 50 also includes a network I/F 209, a keyboard 211, a mouse 212, an optical drive 214, a bus 210, and the like.

The CPU 201 includes an arithmetic unit that implements functions of the management system 50 by reading a program or data stored in the ROM 202, the HD 204, or the like and executing a process. The ROM 202 includes a non-volatile memory in which a program such as an IPL used to start the CPU 201 is stored in advance. The RAM 203 includes a volatile memory used as a work area of the CPU 201.

The HD 204 includes a storage device that stores an OS, a program such as an application program, and various types of data. The HDD 205 controls reading or writing of various types of data from or into the HD 204 in accordance with control of the CPU 201. The display screen 208 includes a display unit that displays various types of information such as a cursor, a menu, a window, characters, and an image.

The network I/F 209 is an interface for performing data communication using the communication network 2. The keyboard 211 is an example of an input device that receives an operation to input characters, numerical values, and various types of instructions by the user. The mouse 212 is an example of a pointing device that receives an operation by the user to select and execute various types of instructions, select an object to be processed, or move the cursor.

The media drive 207 controls reading or writing (storage) of data from or into a recording medium 206 such as a memory card. The optical drive 214 controls reading or writing data from or into an optical disk 213 of various types, the optical disk 213 being an example of a removable recording medium. The bus 210 electronically connects the above constituent elements and transfers an address signal, a data signal, and various types of control signals.

In addition, the above hardware configuration of the computer is an example. The display screen 208, the keyboard 211, the mouse 212, and the like may be externally placed outside the management system 50.

The program above for the management system 50 may be recorded and distributed in a computer-readable recording medium such as the recording medium 206 or the optical disk 213 with a file of an installable format or an executable format. Further, the program for the management system 50 may be stored in the HD 204 or may be stored in the ROM 202 in advance.

Because the relay device 30 has the same hardware configuration as in the management system 50, a description thereof is omitted. However, the HD 204 stores a program for the relay device 30 in order to control the relay device 30. In this case, the program for the relay device 30 may be recorded and distributed in a computer-readable recording medium such as the recording medium 206 or the optical disk 213 with a file of an installable format or an executable format. Further, the program for the relay device 30 may be stored in the HD 204 or may be stored in the ROM 202 in advance.

Further, because the program providing system 90 and the maintenance system 100 also have the same hardware configuration as in the management system 50, descriptions thereof are omitted. However, the HD 204 stores a program for program providing system 90 in order to control the program providing system 90. In this case, the program for the program providing system 90 may be recorded and distributed in a computer-readable recording medium such as the recording medium 206 or the optical disk 213 with a file of an installable format or an executable format. Further, the program for the program providing system 90 may be stored in the HD 204 or may be stored in the ROM 202 in advance.

<Functional Configuration>

FIG. 7 is a diagram depicting a functional configuration of the transmission system 1 according to embodiments. In FIG. 7, the transmission system 1 includes the management system 50, the relay device 30, a plurality of conference devices 10, and corresponding display devices 120 connected to the conference devices 10, all of which are connected to the communication network 2. FIG. 7 depicts a functional configuration necessary for two conference devices 10 to perform communication (conference) in the transmission system 1 depicted in FIG. 1. The transmission system 1 is an example of a communication system and the conference device 10 is an example of a communication device.

(Functional Configuration of Conference Device)

The conference device 10 includes a transmitting and receiving unit 701, a communication control unit 702, an image output unit 703, a remote control unit 704, a voice sound output unit 705, a voice sound input unit 706, an imaging unit 707, a display control unit 708, an operation input reception unit 709, and the like. Each of these units involves a function or a unit that functions, which is implemented when any one of the constituent elements depicted in FIG. 4 operates in response to an instruction from the CPU 101 in accordance with the conference device program loaded in the RAM 103 from the flash memory 104. Further, the conference device 10 includes the RAM 103 depicted in FIG. 4 and a storage unit 1000 implemented with the flash memory 104 depicted in FIG. 4.

The transmitting and receiving unit 701 is implemented with an instruction from the CPU 101 depicted in FIG. 4 and the network I/F 111 depicted in FIG. 4. The transmitting and receiving unit 701 transmits and receives various types of data with another device or a system via the communication network 2.

The communication control unit 702 is implemented with an instruction from the CPU 101 depicted in FIG. 4. When the conference device 10 is powered on or the user performs a predetermined operation, the communication control unit 702 transmits log-in request information indicating a request for login and an IP address of a requestor terminal at the present moment from the transmitting and receiving unit 701 to the management system 50 via the communication network 2. Further, when the user performs an operation to power off the conference device 10, the operation input reception unit 709 turns off the power supply after the communication control unit 702 transmits state information indicating power-off to the management system 50 via the transmitting and receiving unit 701. In accordance with this, the management system 50 can determine that the conference device 10 is powered off.

Further, the communication control unit 702 performs various types of communication control such as calling, receiving a call, cutting, and the like related to communication sessions when a conference is held with another conference device 10.

Further, the communication control unit 702 functions as an incoming call detection unit that detects an incoming call from the other conference device 10 or the like. When the communication control unit 702 detects the incoming call from the conference device 10 or the like, the communication control unit 702 reports the detected incoming call to the remote control unit 704, for example.

The image output unit 703 is implemented with an instruction from the CPU 101 depicted in FIG. 4 and the display screen I/F 117 depicted in FIG. 4. The image output unit 703 outputs an image of a conference or the like to the display device 120 via the image transmission cable 120c. Further, the image output unit 703 outputs images of various types of display screens to the display device 120 via the image transmission cable 120c, the display screens being prepared for calling, receiving, or ending a conference, and various types of settings in accordance with control of the display control unit 708.

The remote control unit (control unit) 704 is implemented with an instruction from the CPU 101 depicted in FIG. 4, the communication I/F 119 depicted in FIG. 4, and the like. The remote control unit 704 remotely controls the display device 120 by transmitting a predetermined control instruction to the display device 120.

Examples of the predetermined control instruction include an instruction to enable or disable a display function of the display device 120, an instruction to transmit state information indicating a state of the display device 120, an instruction to cause the display device 120 to display a character string, an image, or the like, and an instruction to power on/off the display device 120.

The remote control unit 704 uses the transmitting and receiving unit 701, for example, to communicate with the display device 120 via a LAN included in the communication network 2. Alternatively, the remote control unit 704 may use the communication I/F 119 other than the network I/F 111 depicted in FIG. 4 and communicate with the display device 120.

In response to an incoming call detected by the communication control unit 702, the remote control unit 704 according to the embodiments performs various controls on the display device 120 via a session of communication different from a communication path for outputting an image by the image output unit 703.

In addition, the communication path for outputting an image by the image output unit 703 corresponds to a communication path via the image transmission cable 120c in FIG. 2. Further, the session of communication different from the communication path for outputting an image by the image output unit 703 corresponds to transmission and reception of a control signal between the conference device 10 and the display device 120 via a network such as a LAN in FIG. 2.

In the conference device 10, the remote control unit 704 controls the display function of the display device 120 in order to cause the display device 120 to display information about communication received from the other conference device 10. In addition, examples of the information about communication include information indicating that an incoming call is received, information about a caller that has transmitted the incoming call, and information (such as an image) transmitted from the caller that transmitted the incoming call.

The voice sound output unit 705 is implemented with an instruction from the CPU 101 depicted in FIG. 4 and the sound input and output I/F 116 depicted in FIG. 4. The voice sound output unit 705 converts sound data into a voice sound signal, outputs the converted voice sound signal to the loudspeaker 115, and causes the loudspeaker 115 to output voice sound.

The voice sound input unit 706 is implemented with an instruction from the CPU 101 depicted in FIG. 4 and the sound input and output I/F 116 depicted in FIG. 4. After voice sound of the user is converted into voice sound signals by the microphone 114, the voice sound input unit 706 converts the converted voice sound signals into sound data.

The imaging unit 707 is implemented with an instruction from the CPU 101 depicted in FIG. 4, the camera 112, and the imaging device I/F 113 depicted in FIG. 4. The imaging unit 707 converts imaging data (such as an image of a conference), obtained by taking pictures of an object, into image (video) data and outputs the converted image data.

The display control unit 708 is implemented with an instruction from the CPU 101 depicted in FIG. 4. The display control unit 708 causes the display device 120, via the image output unit 703, to display an image of a conference transmitted from the other conference device 10 that serves as a communication destination during the conference. Further, the display control unit 708 can cause the display device 120, via the image output unit 703, to display a destination list received from the management system 50. Further, the display control unit 708 causes the display device 120, via the image output unit 703, to display images of various types of display screens for calling, receiving, or ending a conference, and various types of settings.

The operation input reception unit 709 is implemented with an instruction from the CPU 101 depicted in FIG. 4, the operation button 108, and the power supply switch 109 depicted in FIG. 4. The operation input reception unit 709 receives various types of inputs by the user. For example, if the user turns on the power supply switch 109 depicted in FIG. 4, the operation input reception unit 709 receives the operation to turn on the power supply and controls the conference device 10 in a powered-on state.

The storage unit 1000 stores a terminal identification (ID) to identify the conference device 10, various types of information such as a password, and data.

(Functional Configuration of Display Device)

The display device 120 includes a remote control reception unit 710, an image input unit 711, an image display unit 712, a lighting control unit 713, a control instruction execution unit 714, and the like. Each of these units involves a function or a unit that functions, which is implemented when any one of the constituent elements depicted in FIG. 5 operates in response to an instruction from the CPU 501 in accordance with a display device program loaded in the RAM 503 from the ROM 502.

The remote control reception unit 710 is implemented with the communication I/F 506 and the like depicted in FIG. 5. The remote control reception unit 710 receives information such as a predetermined control instruction transmitted from the conference device 10. Further, the remote control reception unit 710 reports the received control instruction to the control instruction execution unit 714.

Examples of the predetermined control instruction include an instruction to enable or disable the display function of the display device 120, an instruction to transmit state information indicating a state of the display device 120, an instruction to cause the display device 120 to display a character string, an image, or the like, and an instruction to power on/off the display device 120.

The remote control reception unit 710 is connected to a LAN included in the communication network 2, for example, and communicates with the conference device 10 via the LAN. Alternatively, the remote control reception unit 710 may communicate with the communication I/F 119 of the conference device 10 without using the LAN.

In addition, even if the display device 120 is powered off, the remote control reception unit 710 can receive a control instruction from the conference device 10 and report the received control instruction to the control instruction execution unit 714.

The image input unit 711 is implemented with the external input I/F 507 and the like depicted in FIG. 5. The image input unit 711 receives an image transmitted from the conference device 10 via the image transmission cable 120c.

The image display unit 712 is implemented with an instruction from the CPU 501 depicted in FIG. 5 and the projection unit including the LED driving circuit 510, the LED source 511, the projection device 512, and the projection lens 513, depicted in FIG. 5. The image display unit 712 displays (projects) an image received by the image input unit 711, an image, a character string, and the like instructed by the control instruction execution unit 714.

The lighting control unit 713 is implemented with an instruction from the CPU 501 depicted in FIG. 5, the LED driving circuit 510, and the like depicted in FIG. 5. The lighting control unit 713 controls turning on/off a light source such as the LED source 511.

The control instruction execution unit 714 is implemented with an instruction from the CPU 501 depicted in FIG. 5. The control instruction execution unit 714 performs a predetermined process in accordance with control information received by the remote control reception unit 710 and reported to the control instruction execution unit 714.

For example, if the control instruction execution unit 714 receives control information for enabling a function related to display, the control instruction execution unit 714 causes the image display unit 712 to start displaying an image and also causes the lighting control unit 713 to turn on the light source. Further, if the control instruction execution unit 714 receives control information for disabling the display function, the control instruction execution unit 714 causes the image display unit 712 to stop the image display and also causes the lighting control unit 713 to turn off the light source.

Further, if the control instruction execution unit 714 receives a control instruction to "transmit state information indicating a state," the control instruction execution unit 714 collects information on whether the display function is enabled and whether the conference device 10 is connected to the image input unit 711 via the image transmission cable 120c, for example. Further, the control instruction execution unit 714 creates state information including the collected information and reports the created state information to the conference device 10 via the remote control reception unit 710.

Further, if the control instruction execution unit 714 receives a control instruction to "display an image or a character string," the control instruction execution unit 714 causes the image display unit 712 to display the instructed image or the character string.

(Functional Configuration of the Management System)

In the embodiments, a specific configuration of the management system 50 may be arbitrarily determined. Accordingly, only an outline will be described based on an example.

The management system 50 includes a transmitting and receiving unit 51, a communication control unit 52, a management unit 53, and a storage/reading unit 54. Each of these units involves a function or a unit that functions, which is implemented when any one of the constituent elements depicted in FIG. 6 operates in response to an instruction from the CPU 201 in accordance with the transmission management program loaded in the RAM 203 from the HD 204. Further, the management system 50 includes a storage unit 5000 constructed with the HD 204 depicted in FIG. 6.

The transmitting and receiving unit 51 is implemented with an instruction from the CPU 201 depicted in FIG. 6 and the network I/F 209 depicted in FIG. 6. The transmitting and receiving unit 51 transmits and receives various types of data (or information) to and from another terminal, device, or system via the communication network 2.

The communication control unit 52 is implemented with an instruction from the CPU 201 depicted in FIG. 6. The communication control unit 52 performs various types of control so that the conference device 10 communicates (holds a conference) with another conference device 10.

The management unit 53 manages information stored in the storage unit 5000 including an authentication management database (DB) 5001, a terminal management DB 5002, a destination list management DB 5003, a service management DB 5004, a use state management DB 5005, and the like.

The storage/reading unit 54 is implemented with an instruction from the CPU 201 and HDD 205 depicted in FIG. 6. The storage/reading unit 54 stores various types of data in the storage unit 5000 and reads various types of data from the storage unit 5000.

In the following, types of information managed by the management unit 53 are described.

FIGS. 8A to 9B are management tables managed by the management system 50 according to embodiments.

(Authentication Management Table)

FIG. 8A depicts an authentication management table. In the storage unit 5000, the authentication management DB 5001 having the authentication management table as depicted in FIG. 8A is constructed. In this authentication management table, a password is managed in association with a corresponding terminal ID that serves as identification information about the conference device 10 managed by the management system 50.

(Terminal Management Table)

FIG. 8B depicts a terminal management table. In the storage unit 5000, the terminal management DB 5002 having the terminal management table as depicted in FIG. 8B is constructed. In this terminal management table, for each terminal ID of the conference device 10, a destination name if the conference device 10 is a destination, an operation state of the conference device 10, a reception date and time when log-in request information below is received by a management system 50, and an IP address of the conference device 10 are associated and managed.

(Destination List Management Table)

FIG. 8C depicts a destination list management table. In the storage unit 5000, the destination list management DB 5003 having the destination list management table as depicted in FIG. 8C is constructed. In this destination list management table, a terminal ID of a destination terminal registered as a destination candidate is managed in association with a terminal ID of a requestor terminal that sends a request for starting a call.

(Service Management Table)

FIG. 9A depicts a service management table. In the storage unit 5000, the service management DB 5004 having the service management table as depicted in FIG. 9A is constructed. In this service management table, a service ID for identifying service provided to the conference device 10 by the management system 50 and a quality ID depicted in FIG. 9A are associated and managed.

(Use State Management Table)

FIG. 9B depicts a use state management table. In the storage unit 5000, the use state management DB 5005 having the use state management table as depicted in FIG. 9B is constructed. In this use state management table, a quality ID depicted in FIG. 9B, a session ID, and use state information indicating a use state of a communication session indicated by the session ID are associated and managed. For example, in FIG. 9B, "1" indicates being used and "0" indicates not being used (unused) as the use state.

(Functional Configuration of Relay Device)

The relay device 30 relays communication between a first conference device 10 and another conference device 10. For example, if the first conference device 10 communicates with a plurality of other conference devices 10, the first conference device 10 transmits data on a conference image or the like to the relay device 30. The relay device 30 transfers the data received from the first conference device 10 to the other conference devices 10. In accordance with this, when the first conference device 10 communicates with the other conference devices 10, the communication becomes easy because the first conference device 10 may transmit data only to the relay device 30.

In the embodiments, a configuration of the relay device 30 may be arbitrarily determined. Accordingly, a description of a specific configuration of the relay device 30 is omitted.

Process or Operation in Embodiments

In the following, a specific process in the embodiments is described.

First Embodiment

In the first embodiment, the remote control unit 704 of the conference device 10 performs power control (to enable or disable the display function, for example) on the display device 120.

The conference device 10 according to the first embodiment displays an image of a conference on an externally connected display device 120. In such a conference device 10, the display device 120 is connected to the conference device 10 via the image transmission cable 120c or the like before a conference is held, and then the conference device 10 and the display device 120 are powered on.

However, a projector and a large-sized display screen when not used are often powered off in terms of power consumption, for example. However, the conference device 10 may be connected to the communication network 2 to be able to receive an incoming call anytime.

For example, when the conference device 10 receives an incoming call, the conference device 10 outputs information about a caller to the display device 120. However, if the display device 120 has been powered off, the information about the caller output by the conference device 10 is not displayed on the display device 120. Accordingly, even if the user hears a ringtone from the conference device 10, for example, the user cannot obtain the information about the caller and may not be sure about whether to answer the incoming call. Further, at a large conference room or the like, it may take time for the user to power on the display device 120 in response to the ring tone.

According to the first embodiment, the conference device 10 that displays an image of a conference on an externally connected display device 120 makes it easy to display information about a caller on the display device 120 upon receiving an incoming call.

<Process Flow>

Figure 10:
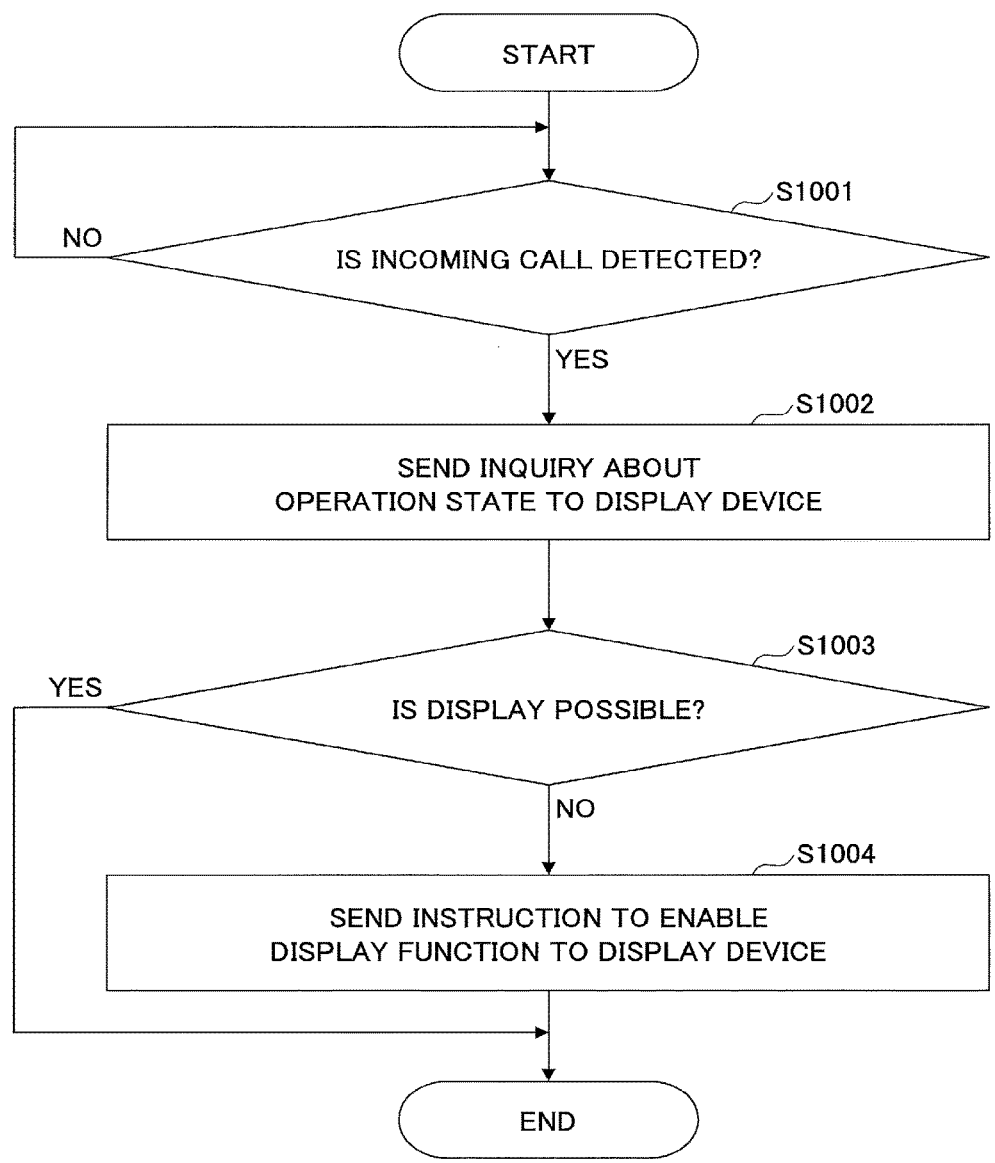
FIG. 10 is a flowchart depicting a process performed by a conference device according to a first embodiment.

FIG. 10 is a flowchart depicting the process performed by the conference device 10 according to the first embodiment. It is assumed that when the process starts in FIG. 10, the conference device 10 is connected to the communication network 2 and can receive an incoming call from another conference device 10. Further, it is assumed that an IP address of the display device 120 is set in the conference device 10 in a method depicted in FIG. 1, for example. Further, it is assumed that the display device 120 is connected to the conference device 10 via the image transmission cable 120c and is supplied with electric power from an outlet, for example.

In step S1001, if the communication control unit 702 (an example of an incoming call detection unit) of the conference device 10 detects an incoming call (YES in step S1001), the conference device 10 performs the process from step S1002.

When the process proceeds to step S1002, the remote control unit 704 of the conference device 10 sends an inquiry about an operation state to the display device 120. In addition, a specific method for sending the inquiry about the operation state is described below.

In step S1003, the remote control unit 704 of the conference device 10 determines whether the display device 120 is capable of performing display (whether a function related to display is enabled) based on information about the operation state obtained from the display device 120. If the display device 120 is not capable of performing display (NO in step S1003), the remote control unit 704 of the conference device 10 transmits control information to enable the function related to display (hereafter referred to as an "enabling instruction") to the display device 120 in step S1004. If the display device 120 is capable of performing display (YES in step S1003), the remote control unit 704 of the conference device 10 ends the process.

In accordance with the above process, when the conference device 10 detects an incoming call, even if the function related to display is stopped in the display device 120, display in the display device 120 automatically starts.

In the following, the process between the conference device 10 and the display device 120 according to the first embodiment is described in detail with reference to a sequence diagram depicted in FIG. 11.

FIG. 11 is a sequence diagram depicting the process between the conference device 10 and the display device 120 according to the first embodiment.

In step S1101, the communication control unit 702 of the conference device 10 detects an incoming call from another conference device 10, for example. The communication control unit 702 that has detected the incoming call reports the detection of the incoming call to the remote control unit 704.

In step S1102, the remote control unit 704 of the conference device 10 transmits information about an instruction to transmit state information to the display device 120 based on the IP address of the display device 120 stored in advance. The information is transmitted to the display device 120 via the LAN included in the communication network 2, for example.

In step S1103, the remote control reception unit 710 of the display device 120 receives the information about the instruction to transmit state information, the information being transmitted from the conference device 10, and reports the received information to the control instruction execution unit 714. In response to this, the control instruction execution unit 714 obtains state information about the display device 120. This state information includes information indicating whether the display function of the display device 120 is operating (enabled) or stopped (disabled), for example.

In step S1104, the control instruction execution unit 714 of the display device 120 transmits, via the remote control reception unit 710, the obtained state information to the conference device 10. In FIG. 11, this state information includes information indicating that the display function of the display device 120 is stopped.

In step S1105, the remote control unit 704 of the conference device 10 receives, via the transmitting and receiving unit 701, the state information transmitted from the display device 120. In FIG. 11, because this state information includes information indicating that the display function of the display device 120 is stopped, the remote control unit 704 transmits an instruction to enable the display function to the display device 120.

In step S1106, when the remote control reception unit 710 of the display device 120 receives the instruction to enable the display function, the instruction being transmitted from the conference device 10, the remote control reception unit 710 reports the received instruction to the control instruction execution unit 714. In response to this, the control instruction execution unit 714 enables the display function of the display device 120. For example, the control instruction execution unit 714 causes the image display unit 712 to display an image input into the image input unit 711 and also causes the lighting control unit 713 to turn on the light source.

In step S1107, the control instruction execution unit 714 of the display device 120 transmits, via the remote control reception unit 710, information indicating that the process to enable the display function is completed to the conference device 10.

In addition, the processes in FIG. 10 and FIG. 11 are only an example. The remote control unit 704 of the conference device 10 may be of a different type as long as the conference device 10 enables, in response to an incoming call, the function (display, turning on) related at least to display of the display device 120 that displays an image.

Further, the remote control unit 704 of the conference device 10 may transmit, in response to an incoming call detected in step S1001, the instruction to enable the display function to the display device 120 in step S1004 while omitting the processes in steps S1002 and S1003.

According to the first embodiment, if the conference device 10 detects an incoming call, the conference device 10 can automatically enable the function related to display of the display device 120 that displays an image. In accordance with this, according to the first embodiment, the conference device 10 that displays an image of a conference on the externally connected display device 120 makes it easy to display information about a caller on the display device 120 upon receiving an incoming call even if the display function the display device 120 is not enabled.

Application Example 1

In the above description, the remote control unit 704 of the conference device 10 enables, in response to an incoming call, the function related to display of the display device 120. In another example, the remote control unit 704 of the conference device 10 may enable, in response to startup of the conference device 10, the function related to display of the display device 120.

FIG. 12A is a flowchart depicting the process of the conference device 10 according to application example 1.

In step S1201, if the conference device 10 receives a startup operation for the conference device 10 from the user (YES in step S1201), for example, the conference device 10 performs the process from step S1202.

In step S1202, the conference device 10 is started and the conference device 10 starts the process.

In step S1203, the remote control unit 704 of the conference device 10 sends an inquiry about an operation state to the display device 120.

In step S1204, the remote control unit 704 of the conference device 10 determines whether the display device 120 is capable of performing display based on information about the operation state obtained from the display device 120. If the display device 120 is not capable of performing display (NO in step S1204), the remote control unit 704 of the conference device 10 transmits an instruction to enable a function related to display to the display device 120 in step S1205. If the display device 120 is capable of performing display (YES in step S1204), the remote control unit 704 of the conference device 10 ends the process.

In accordance with the above process, when the conference device 10 starts, even if the function related to display is stopped in the display device 120, display in the display device 120 automatically starts.

Application Example 2

The conference device 10 may stop the function related to display of the display device 120 depending on a predetermined condition.

Figure 12B:
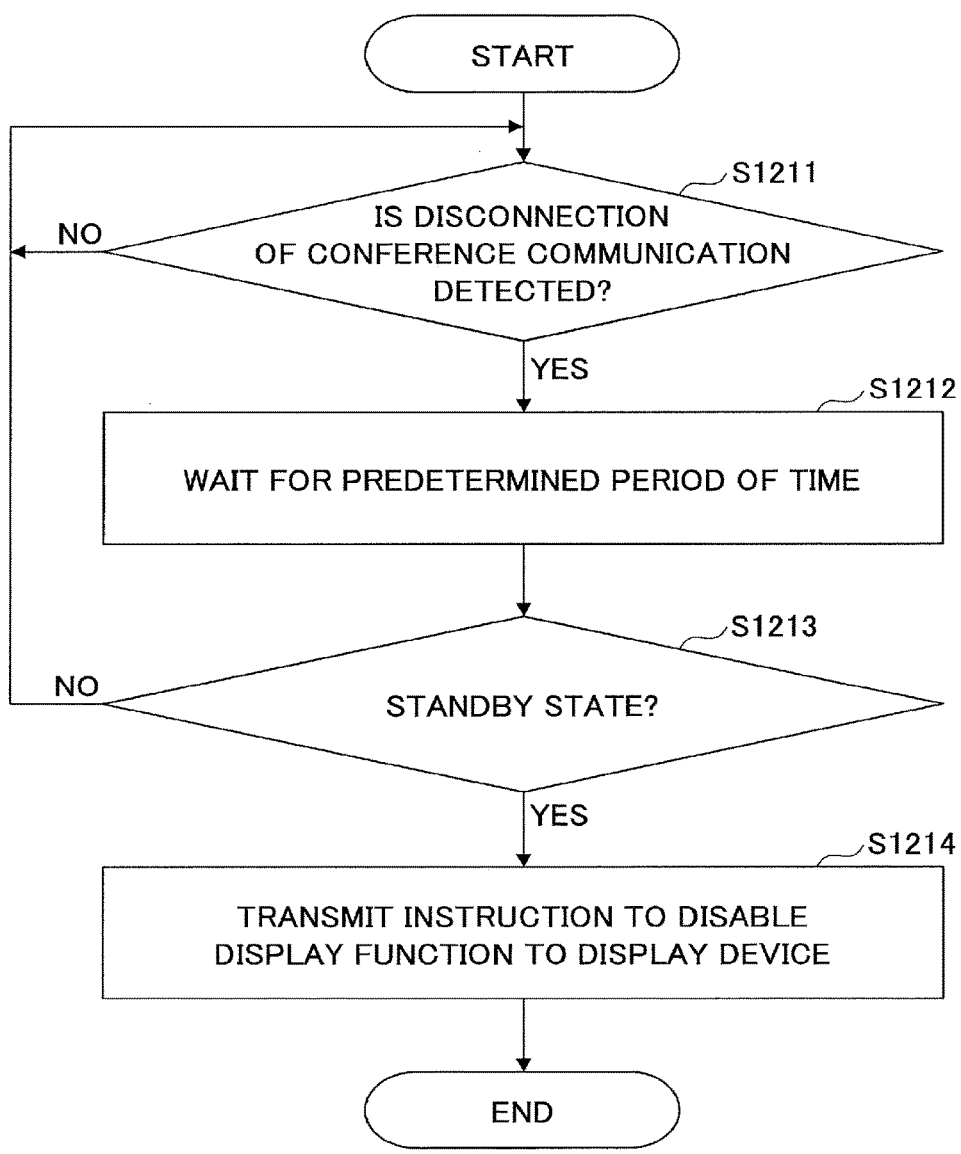
FIG. 12B is a flowchart depicting an application example of a process performed by a conference device according to the first embodiment.

FIG. 12B is a flowchart depicting the process of the conference device 10 according to application example 2. In addition, it is assumed that when the process in FIG. 12B starts, the conference device 10 is in communication with another conference device 10.

In step S1211, if the conference device 10 detects, by the communication control unit 702, that communication for a conference is disconnected (YES in step S1211), the conference device 10 performs the process from step S1212.

When the process proceeds to step S1212, the remote control unit 704 of the conference device 10 waits for a predetermined period of time (one minute, for example).

In step S1213, the remote control unit 704 of the conference device 10 determines whether the conference device 10 is in a standby state (not in communication). If the conference device 10 is in the standby state (YES in step S1213), the remote control unit 704 transmits an instruction to disable the function related to display to the display device 120 in step S1214. In contrast, if the conference device 10 is not in the standby state (in communication, for example) (NO in step S1213), the process of the conference device 10 returns to step S1211 and the same process repeats.

In accordance with the above process, after communication ends in the conference device 10, the display device 120 can automatically stop the function related to display.

Second Embodiment

In the second embodiment, the display device 120 is not connected to the conference device 10 via the image transmission cable 120c. The display device 120 cannot display an image output from the conference device 10. In addition, the process flow between the remote control unit 704 of the conference device 10 and the remote control reception unit 710 and the control instruction execution unit 714 of the display device 120 is the same as in the first embodiment depicted in FIG. 11, so that a detailed description thereof is omitted.

<Process Flow>

FIG. 13 is a flowchart depicting the process performed by the conference device 10 according to the second embodiment. It is assumed that when the process starts in FIG. 13, the conference device 10 is connected to the communication network 2 and can receive an incoming call from another conference device 10. Further, it is assumed that an IP address of the display device 120 is set in the conference device 10 in a method depicted in FIG. 1, for example. Further, it is assumed that the display device 120 is supplied with electric power from an outlet, for example.

Because the process in steps S1001 to S1004 is the same as in the first embodiment, a difference from the first embodiment is mainly described in the following.

In step S1301, the remote control unit 704 of the conference device 10 sends an inquiry about an input state of image signals to the display device 120. In this case, it is assumed that the display control unit 708 of the conference device 10 outputs predetermined images signals (screen to report an incoming call, for example) to the display device 120 via the image output unit 703.

In step S1302, the remote control unit 704 of the conference device 10 determines whether the image signals are input into the display device 120 based on information about the input state of image signals, the information being obtained from the display device 120. If the image signals are input into the display device 120 (YES in step S1302), the process ends. In contrast, if the image signals are not input into the display device 120 (NO in step S1302), the remote control unit 704 of the conference device 10 sends an instruction to display information to the display device 120 in step S1303, the information being for establishing connection of the image transmission cable 120c to the conference device 10 (such as information to suggest connection of the image transmission cable 120c to the user). In addition, this instruction is an example of control information for the display device 120 to establish connection to the conference device 10.

Figure 14A:
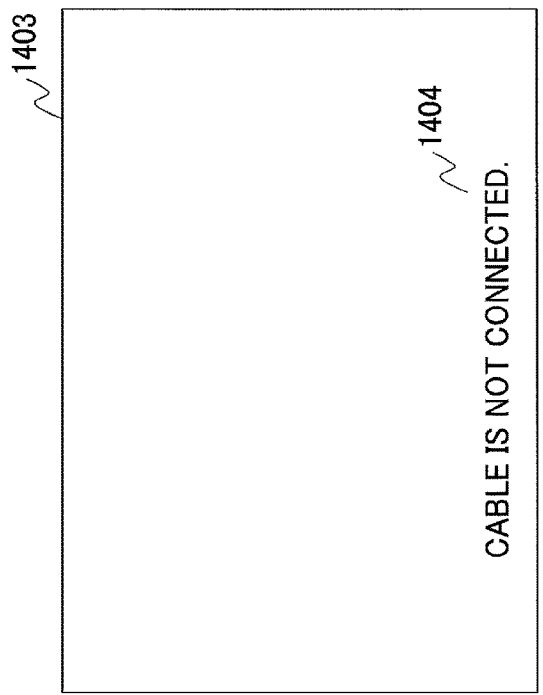
FIG. 14A is a diagram depicting a display screen of a display device according to the second embodiment.
Figure 14B:
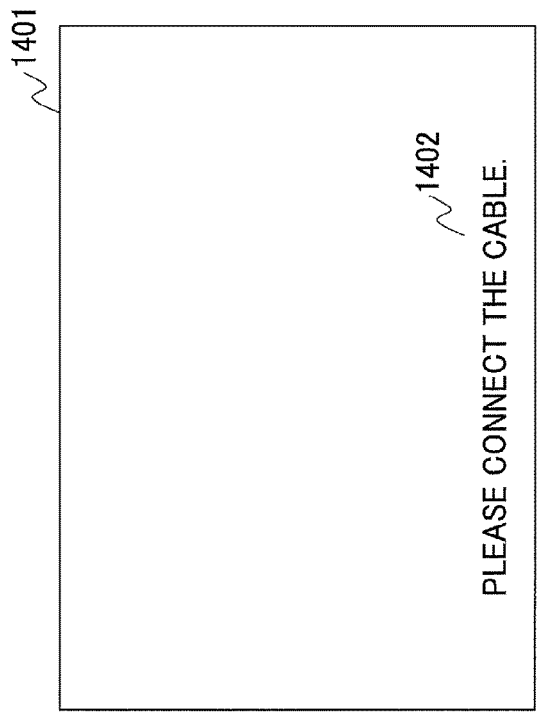
FIG. 14B is a diagram depicting a display screen of a display device according to the second embodiment.

In accordance with this, in the display device 120, based on the instruction received from the conference device 10, the control instruction execution unit 714 causes the image display unit 712 to display information for establishing connection of the image transmission cable 120c. FIGS. 14A and 14B depict display screens rendered by the image display unit 712 of the display device 120.

FIGS. 14A and 14B depict display screens of the display device 120 according to the second embodiment.

In FIG. 14A, as an example of the information for establishing connection of the image transmission cable 120c, a display screen 1401 displays a message 1402 to suggest connection of the image transmission cable 120c to the user such as "Please connect the cable."

In FIG. 14B, as another example of the information for establishing connection of the image transmission cable 120c, a display screen 1403 displays a message 1404 such as "Cable is not connected." Specific contents of a message may be arbitrarily determined as long as the message displayed on the display device 120 can suggest the connection of the image transmission cable 120c to the user who sees the message in this manner.

In addition, the process in which the conference device 10 sends an inquiry about an input state of image signals to the display device 120 in step S1301 of FIG. 13 is an example of a process to confirm whether the conference device 10 is connected to the display device 120 via the image transmission cable 120c.

For example, if the image transmission cable 120c is an HDMI cable, it is possible to detect connection of a device via a Hot Plug Detect (HPD) signal. In this case, the conference device 10 may send, to the display device 120, an inquiry about whether the device is connected to the image input unit 711 in step S1301 of FIG. 13. Alternatively, the image output unit 703 or the like of the conference device 10 may determine whether the conference device 10 is connected to the display device 120 via the image transmission cable 120c.

According to the second embodiment, if the conference device 10 detects an incoming call, the conference device 10 automatically enables the function related to display of the display device 120 that displays an image. Further, if the conference device 10 is not connected to the display device 120 via the image transmission cable 120c, the conference device 10 causes the display device 120 to display information for establishing connection of the image transmission cable 120c.

In accordance with this, according to the second embodiment, the conference device 10 that displays an image of a conference on the externally connected display device 120 makes it easy to display information about a caller on the display device 120 upon receiving an incoming call.

Third Embodiment

In the third embodiment, the remote control unit 704 of the conference device 10 causes, in response to an incoming call, the display device 120 to display information about the incoming call. In addition, the process flow between the remote control unit 704 of the conference device 10 and the remote control reception unit 710 and the control instruction execution unit 714 of the display device 120 is the same as in the first embodiment depicted in FIG. 11, so that a detailed description thereof is omitted.

<Process Flow>

Figure 15A:
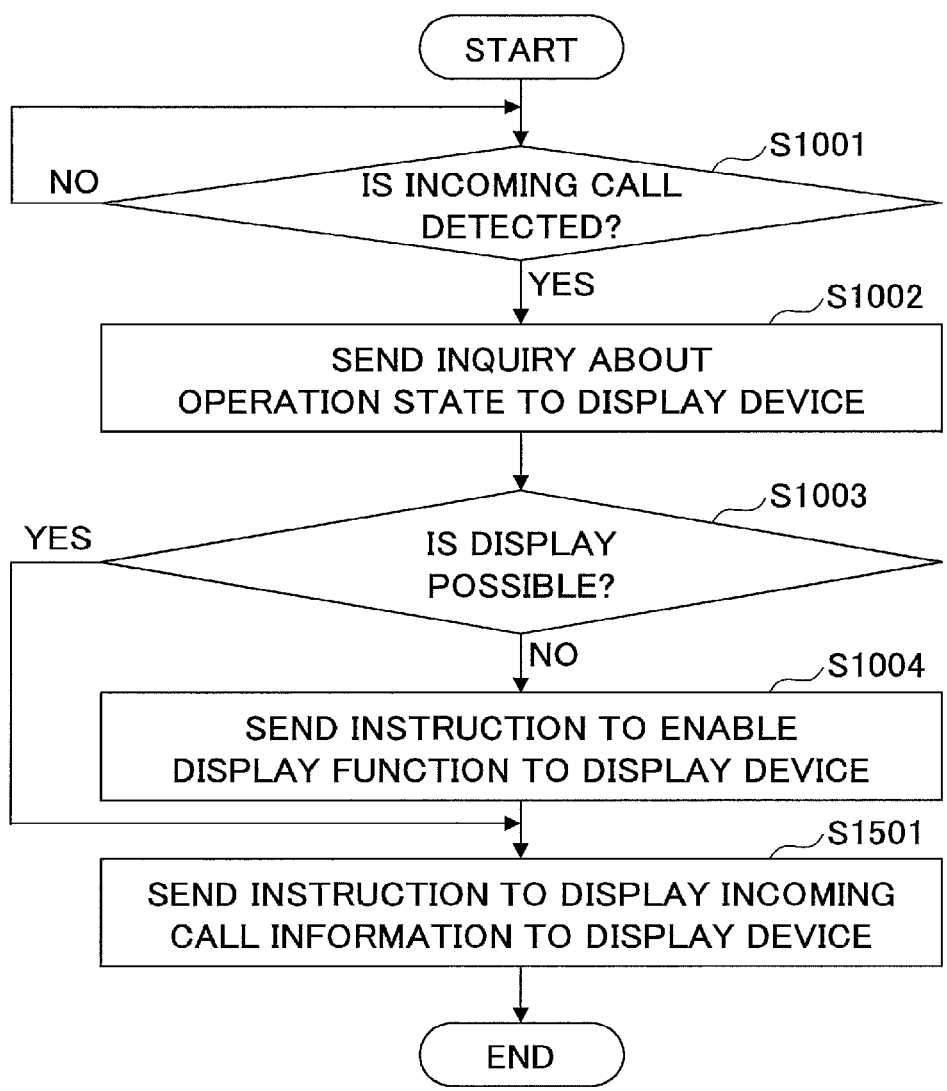
FIG. 15A is a flowchart depicting a process performed by a conference device according to a third embodiment.

FIGS. 15A and 15B are flowcharts depicting the process performed by the conference device 10 according to the third embodiment. It is assumed that when the process starts in FIG. 15A or 15B, the conference device 10 is connected to the communication network 2 and can receive an incoming call from another conference device 10. Further, it is assumed that an IP address of the display device 120 is set in the conference device 10 in a method depicted in FIG. 1, for example. Further, it is assumed that the display device 120 is supplied with electric power from an outlet, for example.

FIG. 15A is the flowchart depicting the process performed by the conference device 10 according to the third embodiment.

The process in steps S1001 to S1004 is the same as in the first embodiment depicted in FIG. 10. In accordance with this process, if the conference device 10 detects an incoming call, the conference device 10 transmits an instruction to enable the function related to display to the display device 120.

In FIG. 15A, the conference device 10 sends an instruction to display information about the incoming call (incoming call information) to the display device 120 in step S1501. This instruction includes information about presence of the incoming call, information about a conference device 10 serving as a caller, information about a user of the caller, and the like.

Figure 16A:
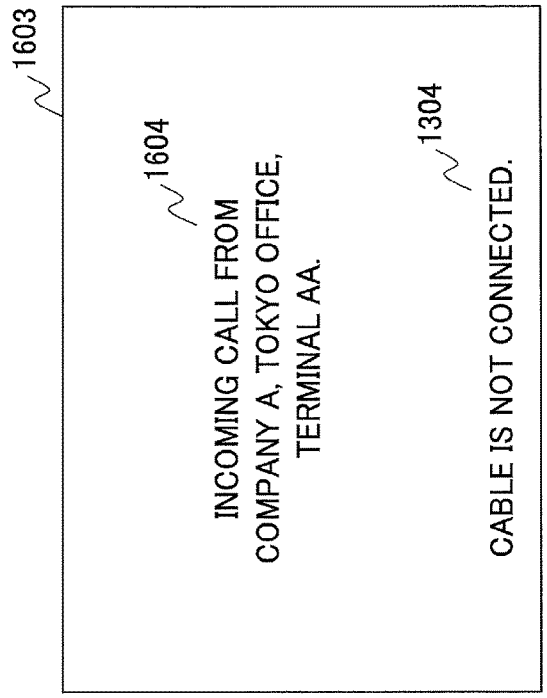
FIG. 16A is a diagram depicting a display screen of a display device according to the third embodiment.

In accordance with this, in the display device 120, based on the instruction received from the conference device 10, the control instruction execution unit 714 causes the image display unit 712 to display the information about the incoming call. FIG. 16A is a diagram depicting a display screen rendered by of the image display unit 712 of the display device 120.

In FIG. 16A, a display screen 1601 of the display device 120 displays a message 1602 to indicate that there is an incoming call. In FIG. 16A, the message 1602 to indicate that there is an incoming call includes identification information (terminal ID 01aa) of the conference device 10 serving as a caller.

In accordance with this, according to the third embodiment, the conference device 10 can cause, in response to an incoming call, the display device 120 to display information about the incoming call even if the conference device 10 is not connected, via the image transmission cable 120c, to the display device 120 that displays an images.

FIG. 15B is a flowchart depicting another process performed by the conference device 10 according to the third embodiment.

The process in steps S1001 to S1004 is the same as the process in steps S1001 to S1004 in the first embodiment depicted in FIG. 10. In accordance with this process, if the conference device 10 detects an incoming call, the conference device 10 transmits an instruction to enable the function related to display to the display device 120.

Further, the process in steps S1301 and S1302 are the same as the process in steps S1301 and S1302 in the second embodiment depicted in FIG. 13. In accordance with this process, the conference device 10 determines whether the conference device 10 is connected to the display device 120 via the image transmission cable 120c.

Further, in FIG. 15B, if the conference device 10 determines that the conference device 10 is not connected to the display device 120 via the image transmission cable 120c in step S1302 (NO in step S1302), the conference device 10 sends an instruction to display information about an incoming call to the display device 120 in step S1511.

In contrast, if the conference device 10 determines that the conference device 10 is connected to the display device 120 via the image transmission cable 120c in step S1302 (YES in step S1302), the process ends. This is because the display device 120 is considered to display an image including incoming call information input from the conference device 10 via the image transmission cable 120c.

In step S1512, the remote control unit 704 of the conference device 10 sends, to the display device 120, an instruction to display information for establishing connection of the image transmission cable 120c to the conference device 10.

Figure 16B:
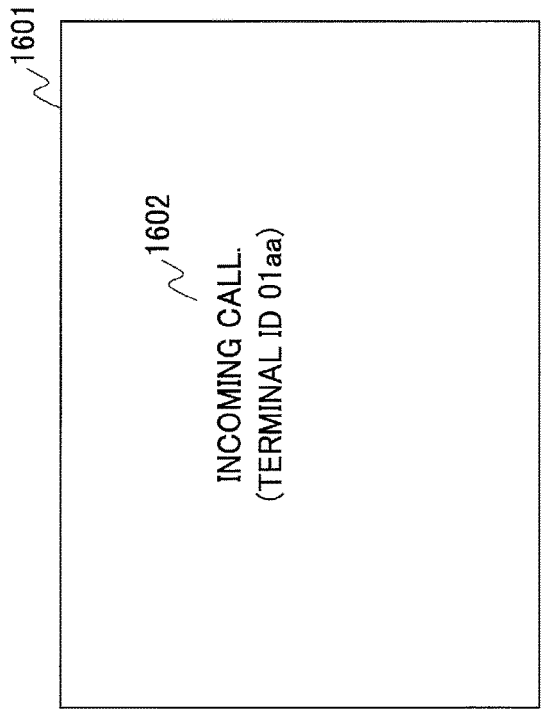
FIG. 16B is a diagram depicting a display screen of a display device according to the third embodiment.

In accordance with the above process, based on the instruction received from the conference device 10, the control instruction execution unit 714 of the display device 120 causes the image display unit 712 to display the information about the incoming call and information to suggest connection of the image transmission cable 120c. FIG. 16B is a diagram depicting a display screen rendered by the image display unit 712 of the display device 120.

In FIG. 16B, a display screen 1603 of the display device 120 displays a message 1604 to indicate that there is an incoming call and a message 1304 to suggest connection of the image transmission cable 120c to the user as an example of the information for establishing connection of the image transmission cable 120c. Further, in FIG. 16B, the message 1604 to indicate that there is an incoming call includes information about the conference device 10 serving as a caller (such as "Company A, Terminal AA at Tokyo Office"). A method for obtaining information about the caller is described below.

In FIGS. 16A and 16B, the information about the incoming call and the information for establishing connection of the image transmission cable 120c include character strings. However, the information about the incoming call or the information to suggest the connection of the image transmission cable 120c may include image information.

In this manner, according to the third embodiment, if the conference device 10 is not connected, via the image transmission cable 120c, to the display device 120 that displays an image, the conference device 10 can cause the display device 120 to display, in response to an incoming call, information about the incoming call, information for establishing connection of the image transmission cable 120c, and the like.

(Process to Obtain Information about Caller)

In the following, a method for obtaining destination information about a caller when the conference device 10 detects an incoming call is described.

FIG. 17 is a sequence diagram depicting a process to obtain caller information in a transmission system according to the third embodiment. In the following description, it is assumed that a conference device 10aa on a transmission side is a "requestor terminal" and a terminal ID of the requestor terminal is "01aa." Further, it is also assumed that a conference device 10db on a reception side is a "destination terminal" and a terminal ID of the destination terminal is "01db."

In step S1701, if the requestor terminal receives an operation to select a destination terminal from the user of the requestor terminal, the requestor terminal transmits start request information to request a start of a session to the management system 50 (step S1702). This start request information includes a requestor terminal ID of the requestor terminal, a destination terminal ID of the destination terminal, a service ID to identify service content to be provided to the requestor terminal, and the like. Further, the start request information also includes an IP address (requestor IP address) of the requestor terminal.

In step S1703, the communication control unit 52 of the management system 50 that has received the start request information from the requestor terminal updates the terminal management table depicted in FIG. 8B based on the terminal ID "01aa" of the requestor terminal included in the start request information. For example, the communication control unit 52 changes information about an operation state corresponding to the terminal ID "01aa" of the requestor terminal to "ON-LINE (in communication)" and updates information about a reception date and time via the management unit 53.

In step S1704, the communication control unit 52 of the management system 50 extracts the service ID included in the start request information received from the requestor terminal.

In step S1705, the communication control unit 52 of the management system 50 obtains, from the service management DB 5004 via the management unit 53, service content corresponding to the extracted service ID.

In step S1706, the communication control unit 52 of the management system 50 sends start request information to request a start of a session to the destination terminal. This start request information includes the requestor terminal ID of the requestor terminal, for example.

In step S1707, the communication control unit 702 of the destination terminal (conference device 10db) can detect an incoming call by receiving the start request information from the management system 50. The communication control unit 702 that has detected the incoming call reports the detection of the incoming call to the remote control unit 704.

The remote control unit 704 can cause the display device 120 to display incoming call information by using the requestor terminal ID of the requestor terminal included in the start request information. If more information about the requestor terminal is to be obtained, the process in steps S1708 to S1712 below is performed.

In step S1708, the remote control unit 704 of the destination terminal transmits destination list request information to request a destination list to the management system 50 via the transmitting and receiving unit 701. This destination list request information includes the terminal ID "01db" of the destination terminal.

The destination list is for facilitating an operation to select a destination by the user by displaying a list of information about destinations of the conference device 10 registered in advance. In the following case, the conference device 10 obtains information about the requestor terminal using the mechanism of this destination list.

In step S1709, when the management system 50 receives the destination list request information from the destination terminal (conference device 10db), the management unit 53 extracts a list of terminals that can communicate with the destination terminal from the destination list management DB 5003. For example, the management unit 53 extracts the list of terminals that can communicate with the destination terminal by searching the destination list management table depicted in FIG. 8C while using the terminal ID "01db" of the destination terminal as a search key.

In step S1710, the management unit 53 of the management system 50 extracts a destination name of each of extracted terminals from the terminal management DB 5002. For example, the management unit 53 extracts the destination name of each terminal by searching the terminal management table depicted in FIG. 8B while using the terminal IDs of terminals as a search key, the terminals being extracted in step S1709.

In step S1711, the management unit 53 of the management system 50 transmits destination list information to the destination terminal (conference device 10db) via the transmitting and receiving unit 51. This destination list information includes the terminal IDs extracted in step S1709 and information about destination names that correspond to the terminal IDs.

In step S1712, the remote control unit 704 of the destination terminal (conference device 10db) extracts a destination name "Japan, Tokyo Office, Terminal AA" that corresponds to the terminal ID "01aa" of the requestor terminal based on the destination list information received from the management system 50. The destination terminal can obtain information about the requestor terminal in this manner, for example.

In step S1713, by performing the process in FIG. 15B, for example, a display device 120db for the destination terminal can display the display screen 1603 as depicted in FIG. 16B in step S1714.

As described above, according to the third embodiment, if the conference device 10 detects an incoming call, the conference device 10 automatically enables the function related to display in the display device 120 that displays an image. Further, the conference device 10 causes the display device 120 to display information about the incoming call using a communication unit (such as the transmitting and receiving unit 701) different from the image output unit 703.

In accordance with this, according to the third embodiment, the conference device 10 that displays an image of a conference on the externally connected display device 120 makes it easy to display information about a caller on the display device 120 upon receiving an incoming call.

Further, according to the third embodiment, upon receiving an incoming call, the conference device 10 can cause the display device 120 to display information about the incoming call even if the conference device 10 is not connected to the display device 120 via the image transmission cable 120c.

Fourth Embodiment

In the fourth embodiment, communication (conference) starts while the conference device 10 is not connected to the display device 120 via the image transmission cable 120c.
<Process Flow>

FIG. 18 is a sequence diagram depicting an incoming call process in a transmission system according to the fourth embodiment. In addition, when the process in FIG. 18 starts, it is assumed that the display device 120db is not connected to the conference device 10db via the image transmission cable 120c.

Because the process in steps S1701 to S1707 in FIG. 18 is the same as in the third embodiment depicted in FIG. 17, a difference from the third embodiment is mainly described in the following.

After the communication control unit 702 of the conference device 10db detects an incoming call from the requestor terminal in step S1707, it is assumed that the user or the communication control unit 702 of the destination terminal performs a response operation in step S1801, for example. In accordance with this, the communication control unit 702 of the conference device 10db transmits start response information to the management system 50.

In addition, a time when the response operation is performed in step S1801 is only an example. The response operation may be performed in another time from step S1707. In the following, the process when the response operation is performed in step S1801 is described as an example.

In step S1802, a session establishment process is performed, so that a session is established between the conference device 10aa and the conference device 10db. In addition, actual communication between the conference device 10aa and the conference device 10db is performed via the relay device 30.

In step S1803, the conference device 10db starts outputting an image of a conference from the image output unit 703 to the display device 120db.

In step S1804, the remote control unit 704 of the conference device 10db transmits, in response to detection of an incoming call in step S1707, an instruction to enable the display function to the display device 120db. This process may be performed before the process in steps S1802 and S1803 or in parallel with the process in steps S1802 and S1803.

In step S1805, the remote control unit 704 of the conference device 10db sends, to the display device 120db, an instruction to transmit an image input state.

In step S1806, because the image transmission cable 120c is not connected, the control instruction execution unit 714 of the display device 120db transmits, to the conference device 10db via the remote control reception unit 710, information to indicate that there is no image input.

In step S1807, if the conference device 10db is not connected to the display device 120db via the image transmission cable 120c during communication, the remote control unit 704 of the conference device 10db sends an instruction, to the display device 120db, to display at least a part of the image of the conference received from the conference device 10aa, for example.

For example, the remote control unit 704 of the conference device 10db may create a still image from a video image received from the conference device 10aa and may send, to the display device 120db, an instruction to display the created still image at predetermined time intervals (every 10 seconds, for example). Alternatively, the remote control unit 704 of the conference device 10db may obtain a part of the video image for a predetermined period (30 seconds, for example) from the video image received from the conference device 10aa and may send, to the display device 120db, an instruction to display the part of the video image that has been obtained.

In step S1808, the remote control unit 704 of the conference device 10db sends an instruction, to the display device 120db, to display information to suggest connection of the image transmission cable 120c.

Figure 19:
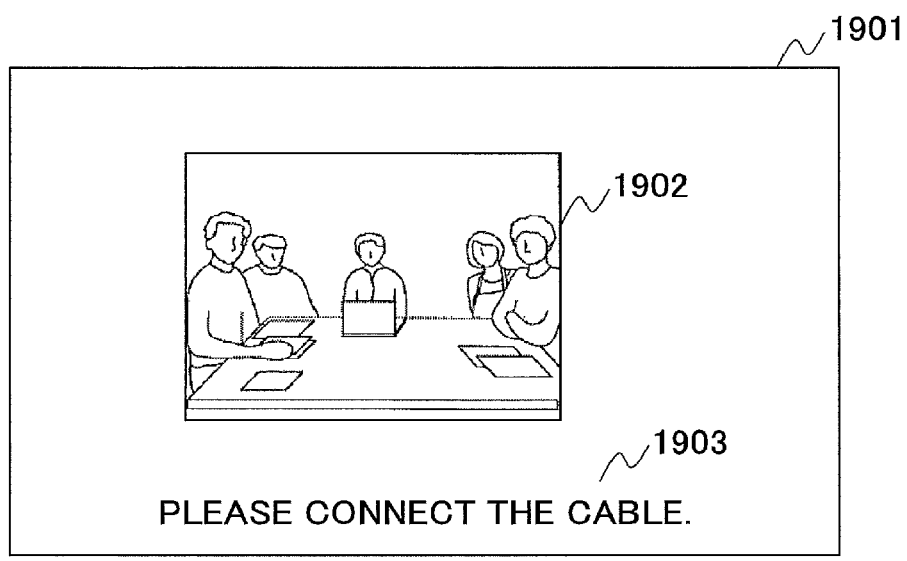
FIG. 19 is a diagram depicting a display screen of a display device during communication according to the fourth embodiment.

In step S1809, in response to the instructions in steps S1807 and S1808, the control instruction execution unit 714 of the display device 120db causes the image display unit 712 to display instructed information. FIG. 19 is a diagram depicting a display screen rendered by the image display unit 712 of the display device 120db.

FIG. 19 is a diagram depicting a display screen of the display device 120db during communication according to the fourth embodiment. A display screen 1901 of the display device 120db displays at least a part of an image of a conference 1902 (still image, for example) and a message 1903 to suggest connection of the image transmission cable 120c.

As described above, according to the fourth embodiment, if the conference device 10 detects an incoming call, the conference device 10 automatically enables the function related to display in the display device 120 that displays an image. Further, the conference device 10 can cause the display device 120 to display at least a part of an image of a conference using a communication unit (such as the transmitting and receiving unit 701) different from the image output unit 703.

In accordance with this, according to the conference device 10 of the fourth embodiment, even if the conference device 10 responds to an incoming call while the conference device 10 is not connected to the display device 120 via the image transmission cable 120c, it is possible to confirm a user of a caller with an image.

CONCLUSION

The conference device (10) according to the present invention is directed to a communication device (10) that causes an externally connected display device (120) to display information about communication received from another communication device, the communication device (10) including:

an incoming call detection unit (702) that detects an incoming call for starting the communication;

an image output unit (703) that outputs the information about communication to the display device (120); and a control unit (704) that controls, in response to the detection of the incoming call, a display function of the display device (120) via a session of communication different from a communication path for outputting an image by the image output unit (703), in which the control unit (704) causes the display device (120) to display the information about communication by controlling the display function of the display device (120).

In accordance with this, for the communication device (10) that causes the externally connected display device (120) to display information about communication received from another communication device, it is possible to provide the communication device (10) that makes it easy to cause the display device (120) to display information about a caller upon receiving an incoming call even if the display function the display device (120) is not enabled.

According to the embodiments of the present invention, for a communication device that causes an externally connected display device to display information about communication received from another communication device, it is possible to provide a communication device that makes it easy to cause the display device to display information about communication upon receiving an incoming call even if the display function the display device is not enabled.

Further, the present invention is not limited to these embodiments, and various variations and modifications may be made without departing from the scope of the present invention.

The present application is based on and claims the benefit of priority of Japanese Priority Application No. 2015-124149 filed on Jun. 19, 2015, the entire contents of which are hereby incorporated by reference.

What is claimed is:

1. A communication apparatus for causing a display device to display information about communication received from another communication apparatus via a network, the display device being connected to the communication apparatus by an image transmission cable, the communication apparatus comprising:
processing circuitry configured to
detect an incoming call for starting the communication;
output an image to the display device via a first communication path provided by the image transmission cable in order to cause the display device to display the information about communication; and
control, via a second communication path provided by the network in response to the detection of the incoming call, a display function of the display device, the second communication path being different from the first communication path, wherein the control of the display function of the display device by the processing circuitry enables the display device to display the information about communication,
wherein the communication apparatus transmits information about an instruction to transmit state information to the display device in response to the detection of the incoming call and receives state information, including information indicating whether a display function of the display device is operating or stopped, from the display device in response to the transmitted information about the instruction, wherein the communication apparatus transmits an instruction to enable the display function to the display device, when the received state information includes information indicating that the display function of the display device is stopped,
wherein the communication apparatus sends an inquiry about an input state of image signals to the display device, wherein the communication apparatus receives information about an input state of image signals from the display device in response to the sent inquiry, wherein the communication apparatus sends an instruction to display information to the display device, the information being for establishing connection of the image transmission cable to the communication apparatus, if the image signals are not input into the display device.

2. The communication apparatus as claimed in claim 1, wherein if the display device is not connected to the communication apparatus by the transmission cable, in response to the detection of the incoming call, the processing circuitry transmits, to the display device, control information for establishing connection of the display device by the transmission cable.

3. The communication apparatus as claimed in claim 1, wherein the information about communication includes information to indicate that there is an incoming call.

4. The communication apparatus as claimed in claim 1, wherein the information about communication includes information about a caller that sent the incoming call.

5. The communication apparatus as claimed in claim 1, wherein the information about communication includes at least a part of an image transmitted from a caller that sent the incoming call.

6. The communication apparatus as claimed in claim 1, wherein the communication apparatus determines whether the communication apparatus is connected to the display device via the image transmission cable, and when the communication apparatus determines that the display device is not connected to the communication apparatus via the image transmission cable, the communication apparatus sends an instruction to display information about the incoming call to the display device.

7. The communication apparatus as claimed in claim 1, wherein the processing circuitry transmits, in response to the detection of the incoming call, to the display device, control information for prompting connection of the display device to the communication apparatus by the image transmission cable, if the display device is not connected to the communication apparatus by the image transmission cable, and wherein the processing circuitry transmits to the display device at least part of an image transmitted from a caller that sent the incoming call together with the control information for prompting the connection, even when the display device and the communication apparatus are not connected by the image transmission cable.

8. A communication system comprising:
the communication apparatus as claimed in claim 1; and
a display device connected to the communication apparatus, wherein the display device includes,
processing circuitry configured to
receive an image output from the communication apparatus,
receive a control instruction to control a display function of the display device, the control instruction being sent from the communication apparatus, and
execute the received control instruction.

9. A communication system for causing a display device to display information about communication received from a communication apparatus via a network, the display device being connected to the communication system by an image transmission cable, the communication system comprising:
processing circuitry configured to
detect an incoming call for starting the communication;
output an image to the display device via a first communication path provided by the image transmission cable in order to cause the display device to display the information about communication; and
control, via a second communication path provided by the network in response to the detection of the incoming call, a display function of the display device, the second communication path being different from the first communication path, wherein the control of the display function of the display device by the processing circuitry enables the display device to display the information about communication, wherein the communication system transmits information about an instruction to transmit state information to the display device in response to the detection of the incoming call and receives state information, including information indicating whether a display function of the display device is operating or stopped, from the display device in response to the transmitted information about the instruction, wherein the communication system transmits an instruction to enable the display function to the display device, when the received state information includes information indicating that the display function of the display device is stopped, wherein the communication system sends an inquiry about an input state of image signals to the display device, wherein the communication system receives information about an input state of image signals from the display device in response to the sent inquiry, wherein the communication system sends an instruction to display information to the display device, the information being for establishing connection of the image transmission cable to the communication system, if the image signals are not input into the display device.

10. A method for controlling a communication apparatus to cause a display device to display information about communication received from another communication apparatus via a network, the display device being connected to the communication apparatus by an image transmission cable, the method comprising:

by the communication apparatus, detecting an incoming call for starting the communication; and by the communication apparatus, unlike a first communication path provided by the image transmission cable used by an image output unit that outputs an image to the display device in order to cause the display device to display the information about communication, controlling, via a second communication path provided by the network in response to the incoming call, a display function of the display device, the second communication path being different from the communication path, wherein the control of the display function of the display device enables the display device to display the information about communication, wherein the communication apparatus transmits information about an instruction to transmit state information to the display device in response to the detection of the incoming call and receives state information, including information indicating whether a display function of the display device is operating or stopped, from the display device in response to the transmitted information about the instruction, wherein the communication apparatus transmits an instruction to enable the display function to the display device, when the received state information includes information indicating that the display function of the display device is stopped, wherein the communication apparatus sends an inquiry about an input state of image signals to the display device, wherein the communication apparatus receives information about an input state of image signals from the display device in response to the sent inquiry, wherein the communication apparatus sends an instruction to display information to the display device, the information being for establishing connection of the image transmission cable to the communication apparatus, if the image signals are not input into the display device.

11. A non-transitory computer-readable storage medium storing a computer-readable program that, when executed by a computer, causes the computer to perform the method for controlling as claimed in claim 10.

* * * * *